US011876805B2

(12) United States Patent
Madaan et al.

(10) Patent No.: US 11,876,805 B2
(45) Date of Patent: Jan. 16, 2024

(54) SELECTIVE PER-MESSAGE PARTICIPATION OF AN EXTERNAL USER IN A MEETING CHAT

(71) Applicant: MICROSOFT TECHNOLOGY LICENSING, LLC, Redmond, WA (US)

(72) Inventors: Nakul Madaan, Prague (CZ); Neeraj Kumar Jain, Prague (CZ); Dominic Roedel, Prague (CZ)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/200,747

(22) Filed: Mar. 12, 2021

(65) Prior Publication Data

US 2022/0294800 A1    Sep. 15, 2022

(51) Int. Cl.
G06F 15/16 (2006.01)
H04L 9/40 (2022.01)
H04L 51/216 (2022.01)
H04L 51/04 (2022.01)

(52) U.S. Cl.
CPC ............ *H04L 63/104* (2013.01); *H04L 51/04* (2013.01); *H04L 51/216* (2022.05); *H04L 63/105* (2013.01)

(58) Field of Classification Search
None
See application file for complete search history.

(56) References Cited

U.S. PATENT DOCUMENTS

| 8,171,087 | B2 | 5/2012 | Carrer et al. |
| 9,882,846 | B1 | 1/2018 | Cohen et al. |
| 10,104,181 | B1 | 10/2018 | Rao et al. |
| 10,812,539 | B2 | 10/2020 | Chen et al. |
| 10,965,633 | B2 | 3/2021 | Cinar et al. |

(Continued)

OTHER PUBLICATIONS

"Application as Filed in PCT Application No. PCT/US20/058074", Filed Date: Oct. 30, 2020, 109 Pages.

(Continued)

*Primary Examiner* — Wing F Chan
*Assistant Examiner* — Andrew Woo
(74) *Attorney, Agent, or Firm* — Newport IP, LLC; Han K. Gim

(57) ABSTRACT

The techniques disclosed herein improve existing systems by rendering a first user interface (UI) on a device of a member in a defined group, including messages being communicated between the defined group of users of the communication session. A selection of a message set including a subset of the messages of the defined group is received for corresponding with a non-member user who is not a member of the defined group. The selected message set is delivered to the non-member user. A second UI is rendered including the selected message set and subsequent messages exchanged between the non-member user and a subset of the users in the defined group directed to the selected message set. Full access is not provided to other subsequent messages in the defined group not directed to the selected message set. Subsequent messages exchanged between the non-member user and the defined group are rendered. The subsequent messages are rendered in context of messages prior to the selected message.

18 Claims, 20 Drawing Sheets

(56) References Cited

U.S. PATENT DOCUMENTS

| | | | |
|---|---|---|---|
| 2009/0016504 A1 | 1/2009 | Mantell | |
| 2010/0057754 A1* | 3/2010 | Moudy | G06Q 20/382 |
| | | | 709/206 |
| 2010/0223345 A1 | 9/2010 | Gupta et al. | |
| 2013/0185363 A1* | 7/2013 | DeLuca | H04L 51/04 |
| | | | 709/206 |
| 2013/0332537 A1 | 12/2013 | Emerick et al. | |
| 2014/0032670 A1 | 1/2014 | Ellingson et al. | |
| 2016/0094504 A1 | 3/2016 | Cinar et al. | |
| 2016/0285797 A1 | 9/2016 | Beausoleil et al. | |
| 2016/0380940 A1 | 12/2016 | Lan et al. | |
| 2018/0367483 A1* | 12/2018 | Rodriguez | H04L 51/046 |
| 2019/0058680 A1 | 2/2019 | Rosania et al. | |
| 2020/0026783 A1* | 1/2020 | Watanabe | G06F 3/04817 |
| 2020/0293975 A1 | 9/2020 | Faulkner et al. | |
| 2020/0382618 A1 | 12/2020 | Faulkner et al. | |
| 2020/0403951 A1* | 12/2020 | Kapoor | H04L 51/216 |
| 2022/0294799 A1 | 9/2022 | Madaan et al. | |
| 2023/0247028 A1 | 8/2023 | Madaan et al. | |

OTHER PUBLICATIONS

"Using in-Meeting Chat", Retrieved from: https://web.archive.org/web/20201101002728/https:/support.zoom.us/hc/en-us/articles/203650445-In-meeting-chat, Nov. 1, 2020, 3 Pages.

Tremblay, Serge, "Inviting External Users to your Meeting in Microsoft Teams", Retrieved from: https://techlab.ytria.com/inviting-external-users-to-your-meeting-in-microsoft-teams/, Apr. 20, 2020, 14 Pages.

"Non Final Office Action Issued in U.S. Appl. No. 17/200,736", dated Aug. 29, 2022, 8 Pages.

"Notice of Allowance Issued in U.S. Appl. No. 17/200,736", dated Dec. 22, 2022, 6 Pages.

"International Search Report and Written Opinion Issued in PCT Application No. PCT/US22/017402", dated Apr. 28, 2022, 12 Pages.

"International Search Report and Written Opinion Issued in PCT Application No. PCT/US22/018235", dated Jun. 3, 2022, 10 Pages.

U.S. Appl. No. 17/200,736, filed Mar. 12, 2021.

"Non Final Office Action Issued in U.S. Appl. No. 18/295,731", dated Oct. 20, 2023, 9 Pages.

* cited by examiner

FIG. 2G

SELECTIVE PER-MESSAGE PARTICIPATION OF AN EXTERNAL USER IN A MEETING CHAT

BACKGROUND

There are a number of systems and applications that provide features that assist users with communications features on their devices. For example, some systems allow users to communicate and collaborate using live video streams, live audio streams, and other forms of real-time, text-based, or image-based applications. The meeting chat of an online communications system is typically used for a quick exchange of ideas and messages pertaining to the topic/agenda of the meeting among meeting participants in the form of direct or side conversations, which may further include the exchange of files, images and other rich collaborative and interactive objects. Often, the meeting participants may want to consult or share a specific piece of information/message with others who are not currently in the meeting. However, the communications system may not readily allow the meeting organizer/participants to add the external user to the ongoing meeting or its chat without having to start a new meeting.

Systems that do not readily enable such users to activate such features can cause a host of issues and negatively impact the effectiveness and accessibility of a communication system in such scenarios. Computing devices that do not facilitate the use of such features can lead to production loss and inefficiencies with respect to a number of computing resources. For instance, participants of a communication session, such as an online meeting, may need to start another chat thread with the external user to pursue a desired discussion. This can lead to fragmented conversations, loss of continuity, and disruption of productivity. Content may need to be re-sent when participants miss salient points or cues during the chat. Such activities can lead to inefficient use of network, processor, memory, or other computing resources. Furthermore, security issues may arise as sensitive information may be inadvertently shared with the wrong participants. Also, when a participant's level of engagement is negatively impacted during a meeting, loss of production may cause a need for prolonged meetings or follow-up meetings, which in turn take additional computing resources. Such inefficiencies can be exacerbated when a system is used to provide a collaborative environment for a large number of participants.

Such drawbacks of existing systems can lead to loss of productivity, reduced security, and the inefficient use of computing resources.

SUMMARY

The techniques disclosed herein provide users with a way to allow an external user outside a secure messaging group to participate in an ongoing meeting's chat on a "per-message" basis, by selecting one or more existing messages in the group to share and correspond with an external user, while keeping the full content of meeting chat and meeting participant list (roster) private. Privileges or permissions of the external participant may be automatically established to include appropriate permissions for various features of the collaboration session. At least two different message views may be provided: (1) all message view to member users of the secure group; and (2) a limited view to the non-member user including (a) selected messages from messages in the group and (b) responses to the shared message.

By allowing an external user to participate in an ongoing meeting's chat on a per-message basis with predetermined access permissions, the existing users need not add the external participant to the current meeting chat and risk sharing the entire conversation history and the names of all the meeting participants with the external user. The meeting participant(s) can share only the selected message(s) with the external user, and the external user can view only the selected message(s) and can reply and collaborate only around that selected message. Various embodiments allow for establishing the membership of the external participant on a per-message basis and allowing the external participant's collaboration around that message only. The external user will not be able to view any other messages for which the external user does not have permission and will not be able to view the participant list of the meeting.

The present disclose also describes the underlying architecture, systems, and data objects that support messaging user interface (UI) functionality that allows an external user outside the secured messaging group to participate in an ongoing meeting's chat on a per-message basis. The architecture, systems, and data objects allow for selection of one or more existing messages in the secured messaging group to share and correspond with an external user, while keeping the full content of meeting chat and meeting participant list (roster) private.

In some embodiments, the data object can be a multi-dimensional data structure that tracks on a per-chat and per-message basis. The data structure may include a dimension where each individual message is associated with users and respective permissions for the users, thereby providing granular control of users and permissions on a per-message basis.

The techniques described above can lead to more efficient use of computing resources. In particular, by automating a process for facilitating participant promotion settings, user interaction with the computing device can be improved. The techniques disclosed herein can lead to a more efficient use of computing resources by eliminating the need for a person to perform a number of manual steps to search, discover, review, display, and select various settings, which may be different for each application and system. The reduction of manual processes can lead to fewer inadvertent inputs and errors. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters. The same reference numbers in different figures indicate similar or identical items.

FIG. 2G illustrates an example user interface in accordance with an embodiment.

DETAILED DESCRIPTION

Figure 1:
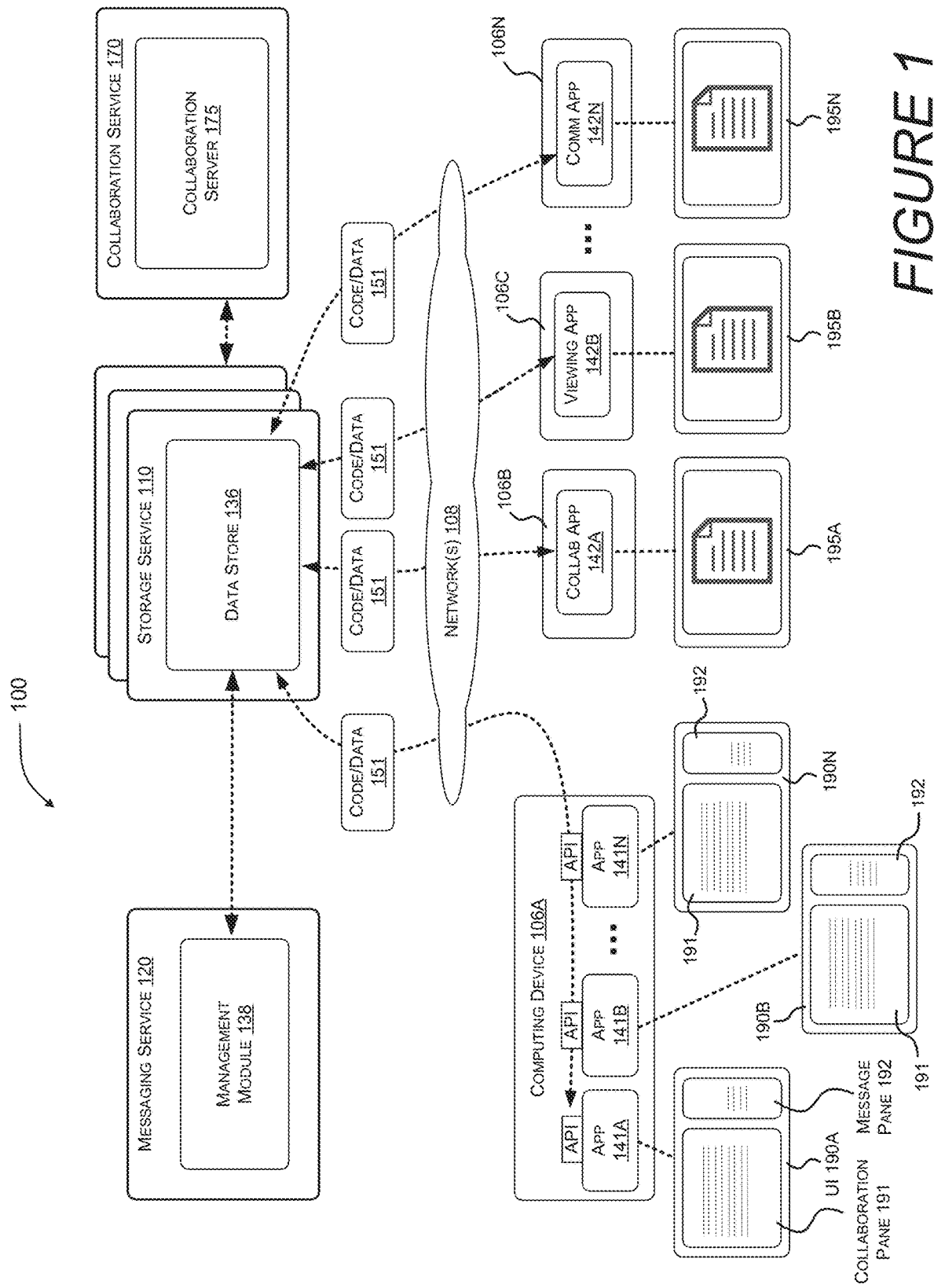
FIG. 1 illustrates aspects of a system for allowing an external user to participate in an ongoing meeting's chat on a per-message basis with predetermined access permissions.

The techniques disclosed herein provide systems with a way to allow an external user outside a secure messaging group to participate in an ongoing meeting's chat on a per-message basis, by selecting one or more existing messages in the group to share and correspond with an external user, while keeping the full content of meeting chat and meeting participant list (roster) private. Privileges or permissions of the external participant may be automatically established to include appropriate permissions for various features of the collaboration session. As used herein, an external user or external participant may be any user who is not currently a member of a group of users who are participating in a chat session. The group of users may originate as users who were invited to a collaboration session or who were otherwise original members of a chat group.

The meeting chat of an online collaboration session is typically used for the quick exchange of ideas and messages pertaining to the topic/agenda of the meeting between meeting participants in various forms of direct and side conversations, and the sharing of files, images and other rich collaborative and interactive objects. Often, the meeting participants may want to consult or share a specific piece of information or a particular message with others, either to obtain their input or to share a piece of information with them.

On the one hand, meeting participants typically want to collaborate with an external person by sharing information from the meeting, while, on the other hand, the meeting organizer/participants may not be able to add the external user to the ongoing meeting or its chat due to security, privacy, or simply just to reduce noise in the ongoing conversation. For example, the external user, once added to a meeting, may be able to see the roster and the topic of the meeting.

In many systems, the only way to collaborate with an external person is to start another chat thread with the external user to discuss a specific point pertaining to a message or other information. This results in the creation of another chat/conversation, which can lead to fragmented conversations, which mitigates the advantages of having a collaboration session in the meeting chat with all the meeting related content at one place. New chats/conversations may lose aspects of the meeting context. A centralized and comprehensive meeting space is one objective of many collaborative platforms.

Rather than focusing a chat session on the participants of a meeting chat, the present disclosure provides a way to focus a meeting on an individual message or a group of messages in a meeting chat by allowing one or more messages to be a starting point for a new conversation. Various embodiments describe techniques for creating a messaging and permission model around individual messages. In some embodiments, each message may have its own membership and permissions. New chat sessions may be created with a clear demarcation from the current chat, but can still be integrated with the larger context of the current chat.

While many of the examples described herein are illustrated around starting chat sessions from selected messages, other meeting objects may be used to start a new conversation, such as an uploaded file or any other object that is shareable.

A micro-permissioning model is disclosed that allows external participants to be assigned different privileges and permission as compared to the participants in the main meeting. For example, external participants may not be allowed to view the roster of participants in the main meeting or the name of the main meeting. External participants may not be allowed to add participants to the new conversation. In some embodiments, the meeting moderator or other participant from the main meeting may be provided an option to add permissions to the external participant, such as accessing the meeting recording, or seeing the meeting title. Furthermore, the meeting moderator or other participant may be provided an option to exclude certain original participants or to otherwise determine the roster of participants of the side chat. In some embodiments, the described techniques can be extended to chat sessions that persist beyond the current meeting session.

The described techniques may be extended to enable multiple chats from the original meeting, or additional side chats from the first side chat to create nested chat sessions.

Technical problems encountered when adding external participants to chat sessions include a lack of efficient methods for adding external session participants, which can result in multiple separate chat sessions being started and processed. Lack of a consistent and automated methodology for adding for external session participants may result in users having to repeatedly interrupt processes in order to start new sessions, thereby consuming additional computing, storage, and network resources. Furthermore, another technical problem is the potential lack of security and privacy which can result from adding an external participant to an existing chat session, or by starting a new session and inadvertently sharing the wrong information between sessions.

The technical problems solved by the techniques described herein include lack of or inefficient computing for applying and maintaining promotion efficient chat communications. Technical effects achieved include improvements over conventional systems for starting, maintaining, and securing chat sessions by more efficiently utilizing processing and storage resources executed by computing systems in order to execute processes for providing nested and secured chat sessions.

Systems and methods consistent with the present disclosure achieve the benefits noted above by implementing a system configured to allow the meeting participants to collaborate with external participants with a unified and automated experience (by keeping all the conversations pertaining to the meeting in a single place without fragmentation) while ensuring the privacy and security of the meeting topic In response to the addition of new sessions, the privileges of the external participants may be efficiently or automatically determined for various features of the collaboration session.

The present disclosure describes a technical solution to allow an external user outside a secure messaging group to participate in an ongoing meeting's chat on a per-message basis, by selecting one or more existing messages in the group to share and correspond with an external user, while keeping the full content of meeting chat and meeting participant list (roster) private. Privileges or permissions of the external participant may be automatically established to include appropriate permissions for various features of the collaboration session.

The disclosed embodiments allow an external participant to collaborate with participants of a meeting chat on a selective per-message basis by allowing meeting participants to share selected messages without sharing the entire meeting chat content and the list of meeting participants. In some embodiments, membership of an external participant may be provisioned on a per-message basis rather than full membership of the meeting chat. The disclosed embodiments can enable improved collaboration capabilities and enhanced micro-permissions in the context of a meeting chat while maintaining the security and privacy aspects of the collaboration.

In some embodiments, the security and privacy settings can be role-based. For example, the security and privacy settings may be specific to an individual participant, and some settings may be applicable to a group of users, for example members of an organization. In some embodiments, one or more roles may be defined that can be automatically assigned to a user based on one or more characteristics. For example, if a user is identified as being part of an organization, a role can be automatically assigned to that user. The role can allow the user to be associated with a grouping of security and privacy settings that are commonly invoked for users who are part of the organization.

In an example implementation, an entity such as an enterprise can offer a number of predetermined sets of settings for one or more types or roles of users. A particular user may be associated with a particular role or a selected set of settings. The settings may be associated with the user and provided to systems and applications as the user participates in meetings and other activities where the user may participate in meeting chats. The settings may be transferred to various applications and systems, such as those in connected meeting rooms, various user devices, and services.

While many of the described examples are provided in the context of certain chat settings, the disclosed embodiments may be applied any type of interactive messaging applications.

FIG. 1 illustrates a system 100 for enabling the participation of an external user outside a secure messaging group in an ongoing meeting's chat on a per-message basis. The figure illustrates chat sessions in the context of applications 141. In this example, a user can interact with an individual application 141 to launch and participate in applications such as a communications session and send and receive messages. The applications 141 may each be configured to display a collaboration pane 191 and, in one example, a message pane 192. Various content pertaining to a collaboration session may be displayed in the collaboration pane 191. In the illustrated example, a user may receive questions, comments, and other data for the communication session. Other communicative features for functionality may be invoked in other examples. The message pane 192 of each application 141 may be synchronized to enable a user to receive data for application 141.

The use of a message pane 192 is one example implementation, and other types of communications interfaces may be enabled and provided on computing devices 106. The applications 141 may receive and send code/data 151. In some configurations, the code/data 151 can be in the form of text, images, media or any other form of data. The messaging service 120 may maintain messaging information for systems and devices via applications 141 and can send, for example, a message to a computing device 106A. The messaging service 120 may also monitor video, audio, and other data being communicated during a communications session and identify triggers that can cause a prompt to be sent to a moderator, or for security settings to be automatically invoked. The computing device 106A may receive moderator inputs for adding participants and send the settings to the messaging service 120. In response to a request to add a user to a messaging session, the collaboration service 170 may apply the security settings in configuring and rendering content to the computing device 106.

The code/data 151 can include data that is stored within storage service 110 including a data store 136 and managed by management service 120 comprising a management module 138. The code/data 151 can be communicated to any number of computing devices 106, referred to herein as computing devices 106B-106N, from a first computing device 106A or the service 110 via a network 108. Each computing device 106B-106N associated with a recipient can display the code/data 151 on a user interface 195 (195A-195N) by the use of a viewing application 142. The viewing application 142 can be any suitable application such as a presentation program, a web browser, a media player, etc. The viewing application 142 may also be a web-based application. In one embodiment, the viewing application 142 may be a virtual assistant that uses voice instead of a visual representation to convey data content, e.g., facilitating text-to-speech (TTS). In some embodiments, the viewing application 142 may be an augmented reality, mixed reality, or virtual reality device and the code/data 151 can be rendered within a virtual reality display.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user with certain impairments to view and interact with data in a wide range of communications and collaborative scenarios while operating a computing device. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to pause applications, reconfigure settings, incorporate updates for, and toggle between, a number of applications, including a specialized presentation program. Other technical effects other than those mentioned herein can also be realized from implementations of the technologies disclosed herein.

Figure 2A:
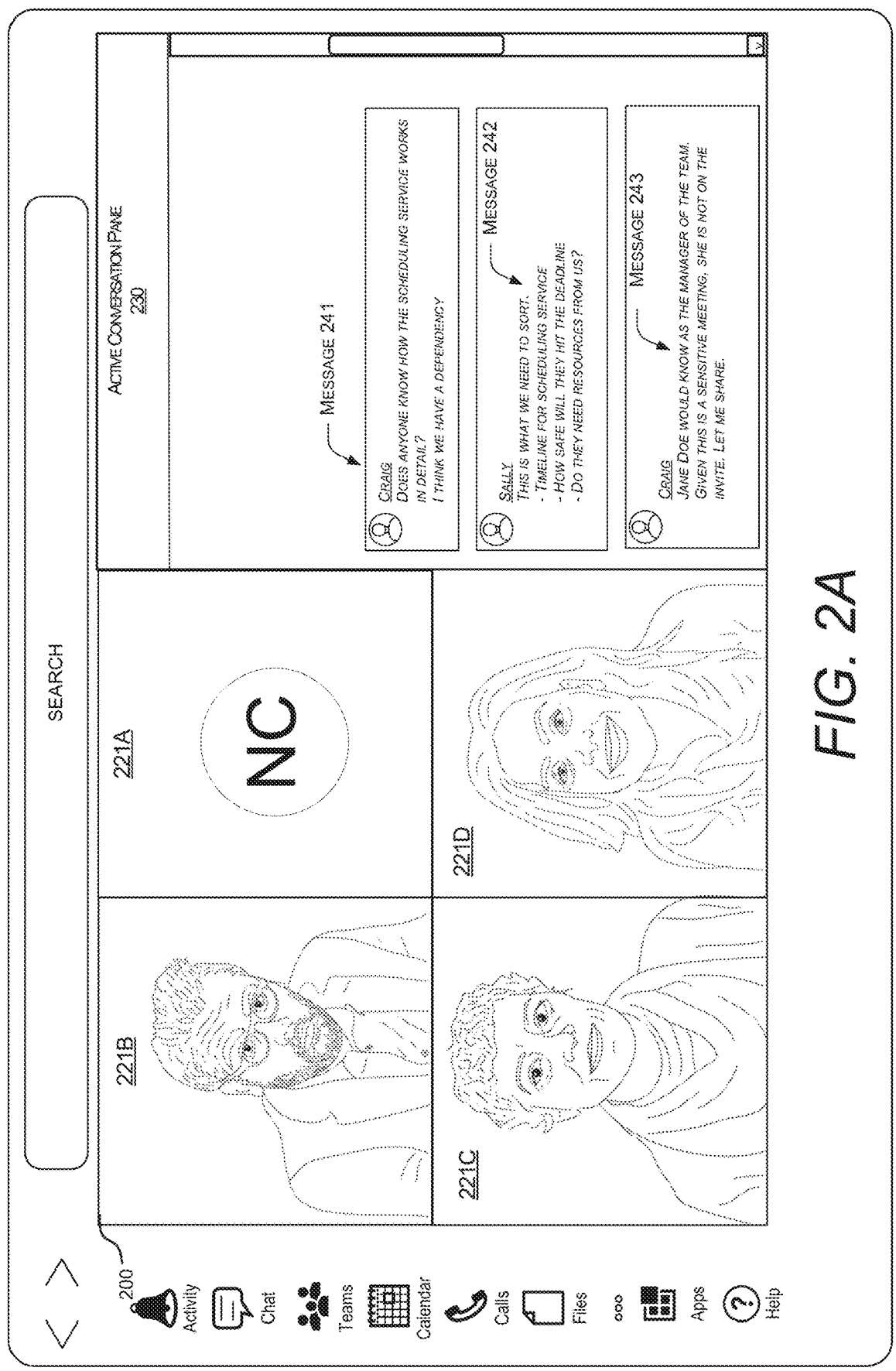
FIG. 2A illustrates an example user interface in accordance with an embodiment.

To illustrate the described techniques using an example, consider an ongoing meeting on a sensitive topic. Turning to FIG. 2A, illustrated is an example user interface 200 showing a collaborative session including four participants 221A, 221B, 221C, and 221D. Meeting participants may be engaged in the conversation and collaboration in the active meeting chat pane 230, showing messages 241, 242, and 243.

Figure 2B:
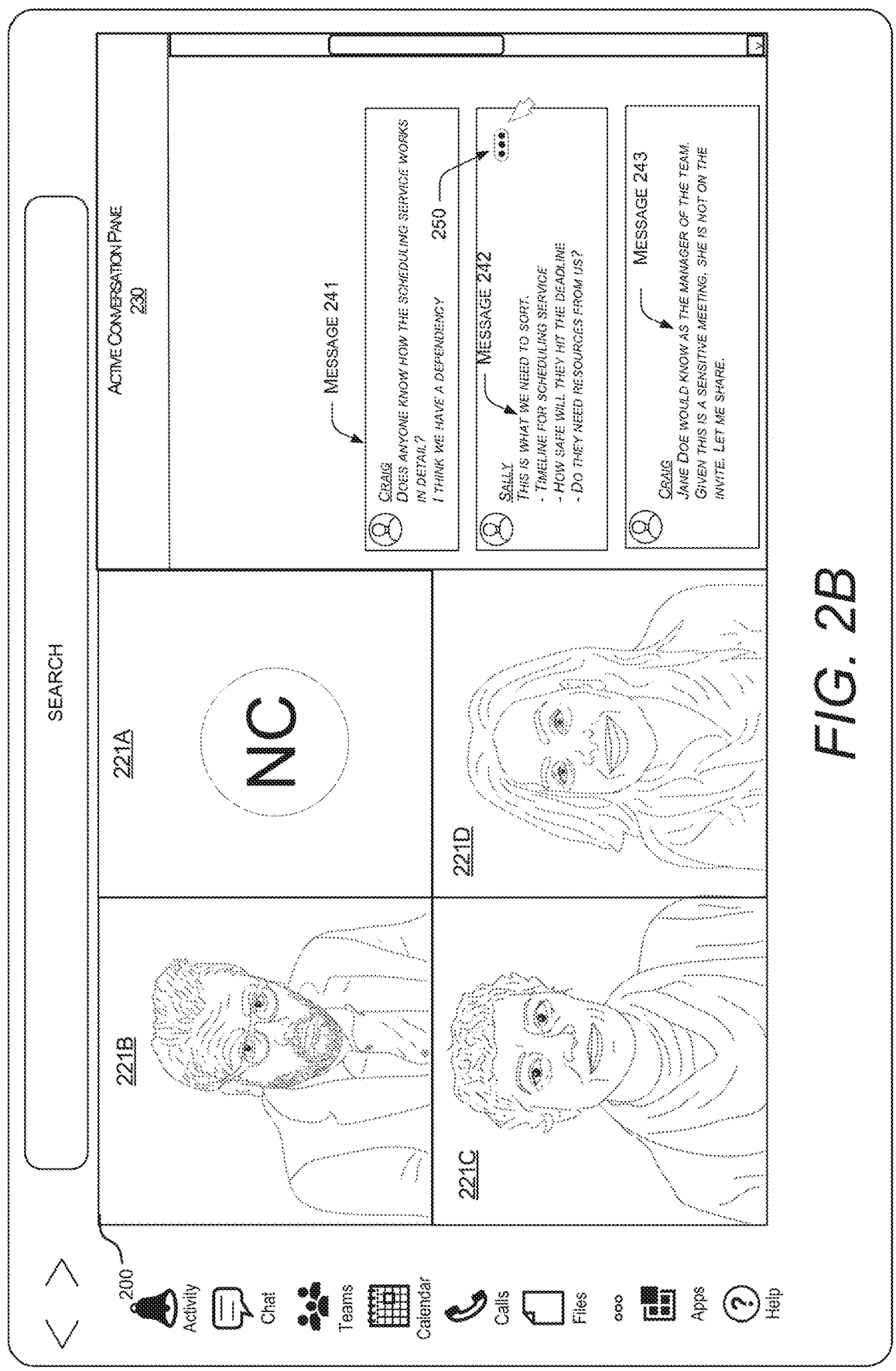
FIG. 2B illustrates an example user interface in accordance with an embodiment.
Figure 2C:
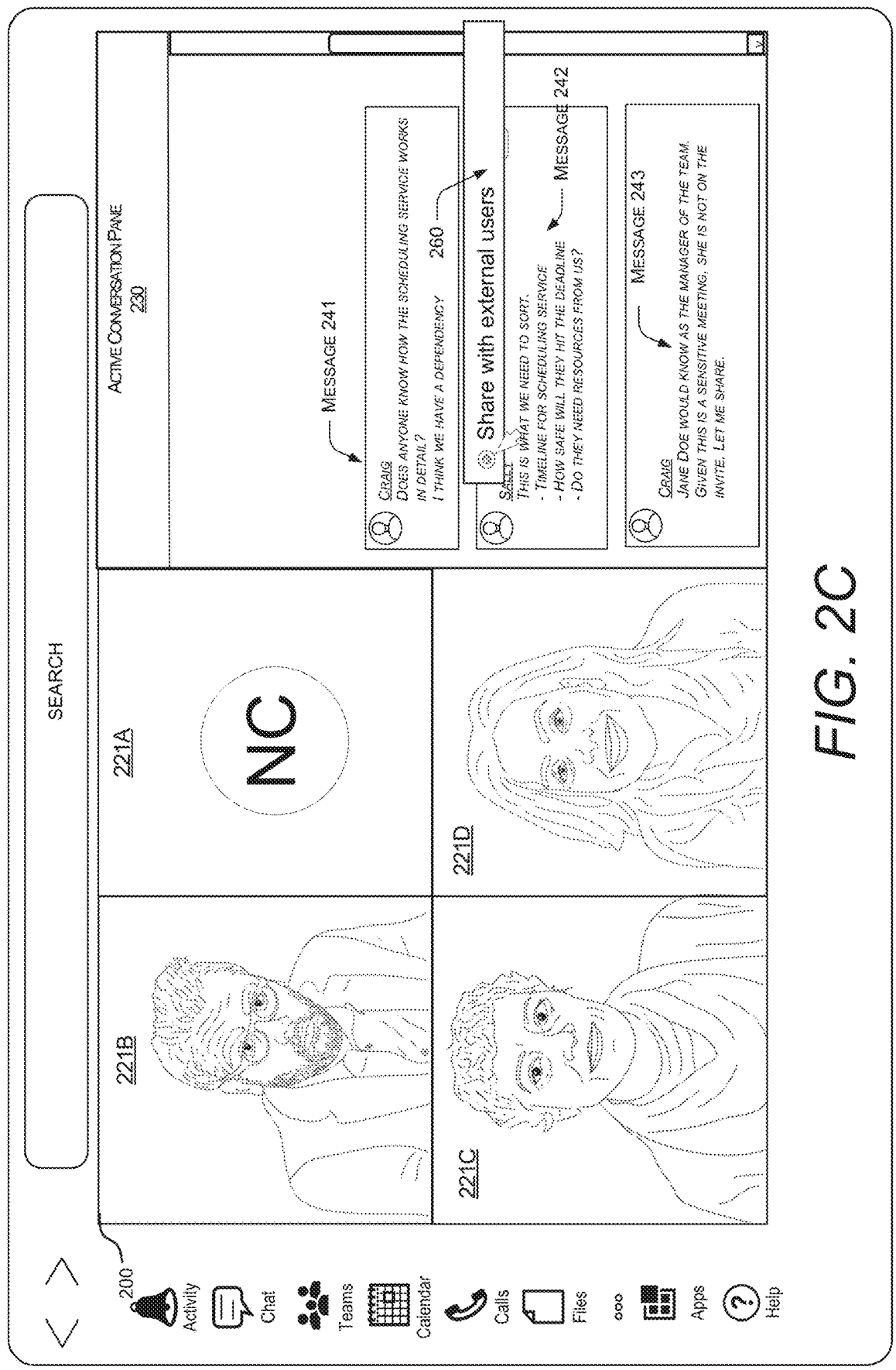
FIG. 2C illustrates an example user interface in accordance with an embodiment.
Figure 2D:
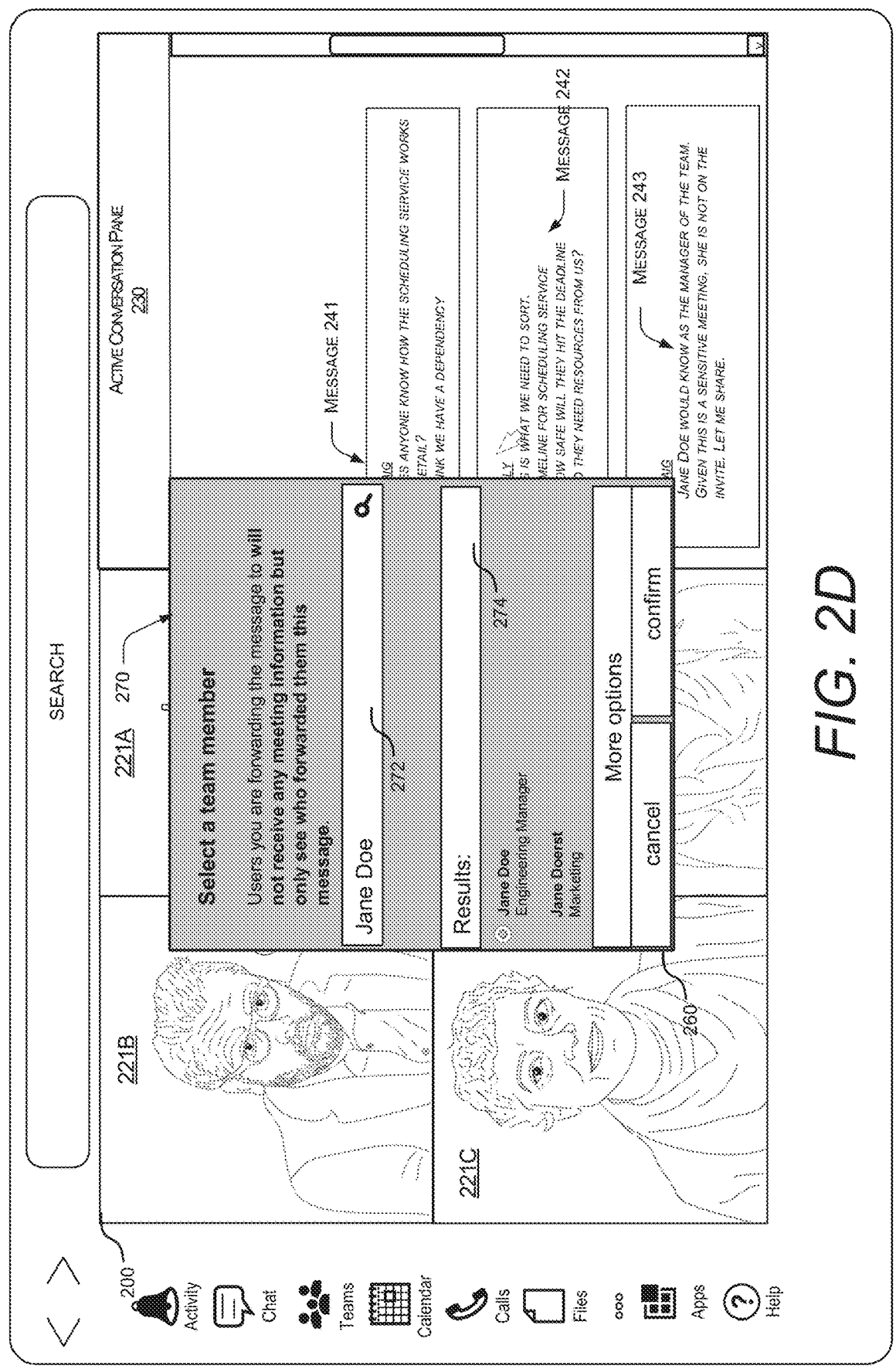
FIG. 2D illustrates an example user interface in accordance with an embodiment.
Figure 2E:
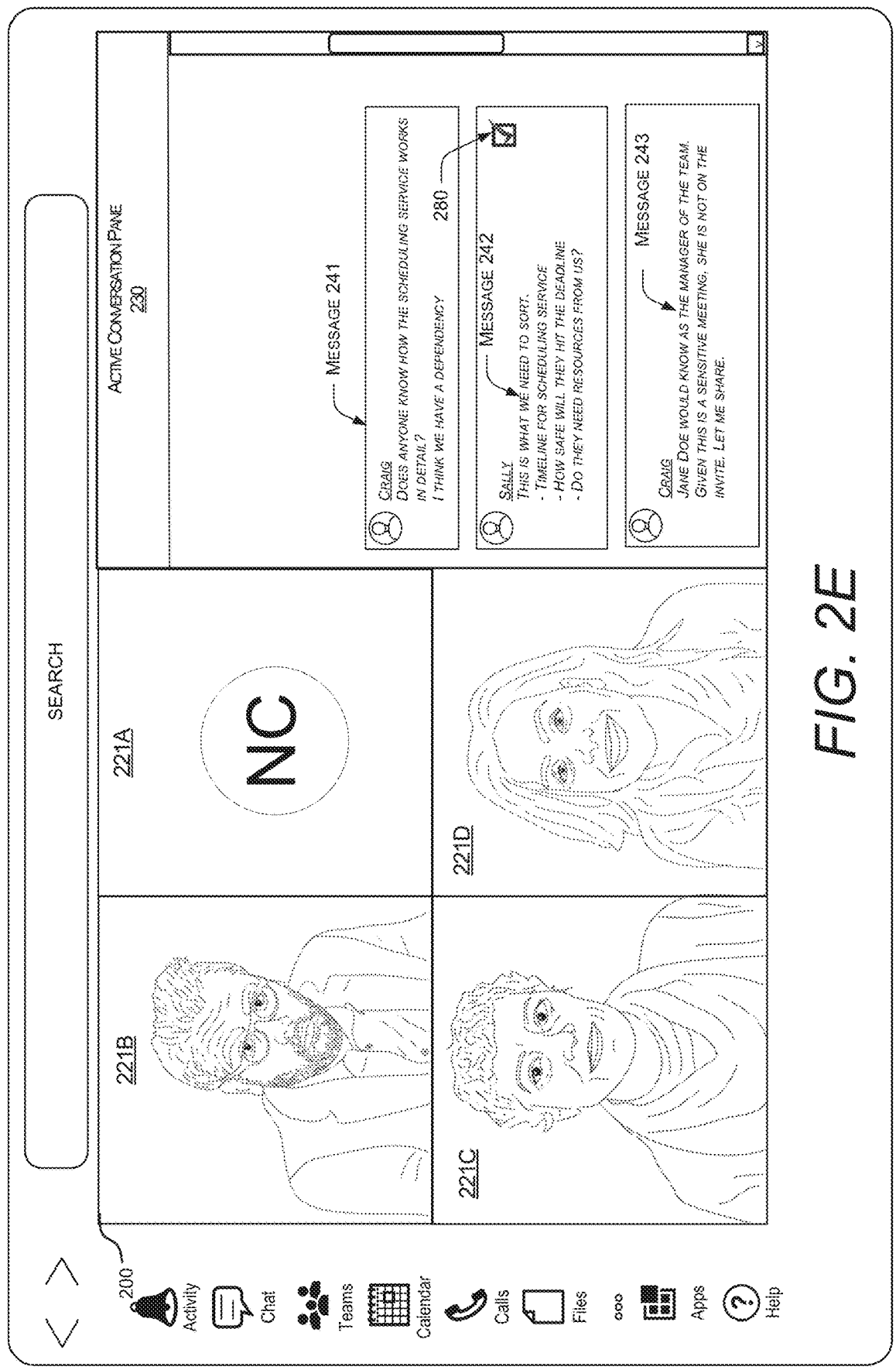
FIG. 2E illustrates an example user interface in accordance with an embodiment.

While messaging in the meeting chat, a user may determine that input/brainstorm would be helpful with an external participant named Jane Doe, as shown in message 243. Rather than adding Jane Doe in the meeting chat and sharing all the information for the meeting, the user may right click on a selected message as shown by input action 250, as shown in in FIG. 2B. FIG. 2C illustrates that in response to the right click, an option to "share with external users" menu item 260 may be rendered. Referring to FIG. 2D, a dialog box 270 may be opened. The dialog box 270 may include a search bar 272, where the user can enter search text. A results box 274 may show results of the text search. As shown, the user may select Jane Doe from the list. Referring to FIG. 2E, the particular message 242 may be marked with a special icon 280 in the meeting chat indicating that the message is shared with external participants.

Figure 2F:
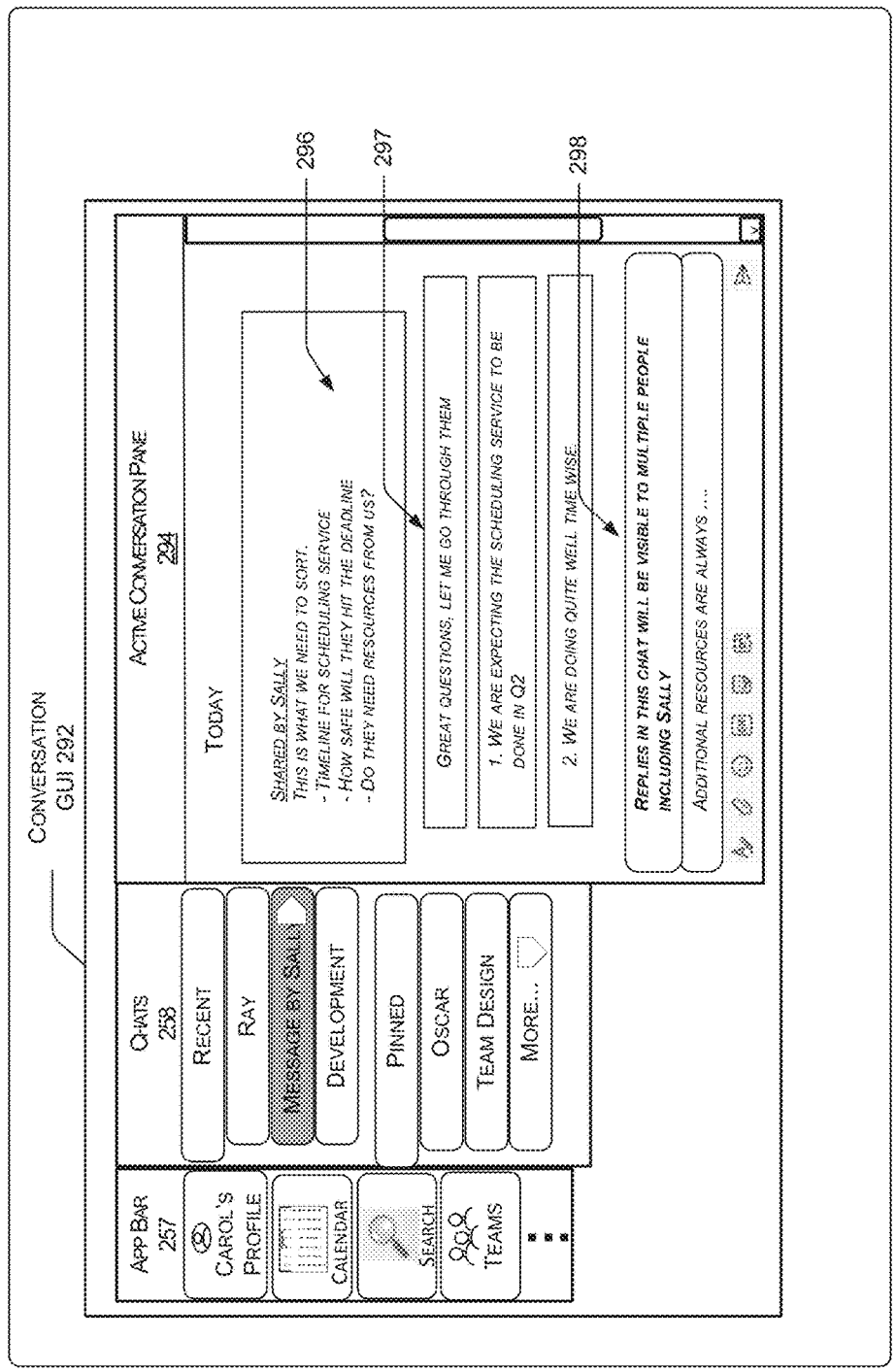
FIG. 2F illustrates an example user interface in accordance with an embodiment.

FIG. 2F is an example of a display screen 290 presenting a graphical user interface (GUI) 292 that illustrates a visual notification indicating a shared message. As illustrated, the graphical user interface 292 may be associated with a messaging application such that it contains conversations, and therefore, may be referred to herein as a conversation GUI 292. In the example of FIG. 2F, the conversation GUI 292 includes an app bar 257, a list of conversations/channels 258, and an active conversation pane 294.

The conversations/channels 258 includes a list of conversations that a user (e.g., Jane Doe) is participating in. As illustrated and by example only, the list of conversations/channels 258 may include a "message by Sally" indication. Jane Doe may receive other notifications in her chat window that a message from Sally is available. When Jane Doe clicks on the conversation/channel it or otherwise opens the message 296 from Sally, the active pane 294 may indicate a message from the given user Sally. In some embodiments, there may be no indication or mention of any other information related to the originating meeting. The only content visible to Jane Doe may be the message body and the name of the sharer. Jane Doe may enter responses 297 which may be shown on the active pane 294. In some embodiments, Jane Doe will be able to view the message(s) and will be able to reply to via a text message/image/files any other object that is supported by the messaging application. In addition, the GUI 292 may provide a notification 298 that all the replies will be automatically shared with a larger list of participants.

Figure 2G:
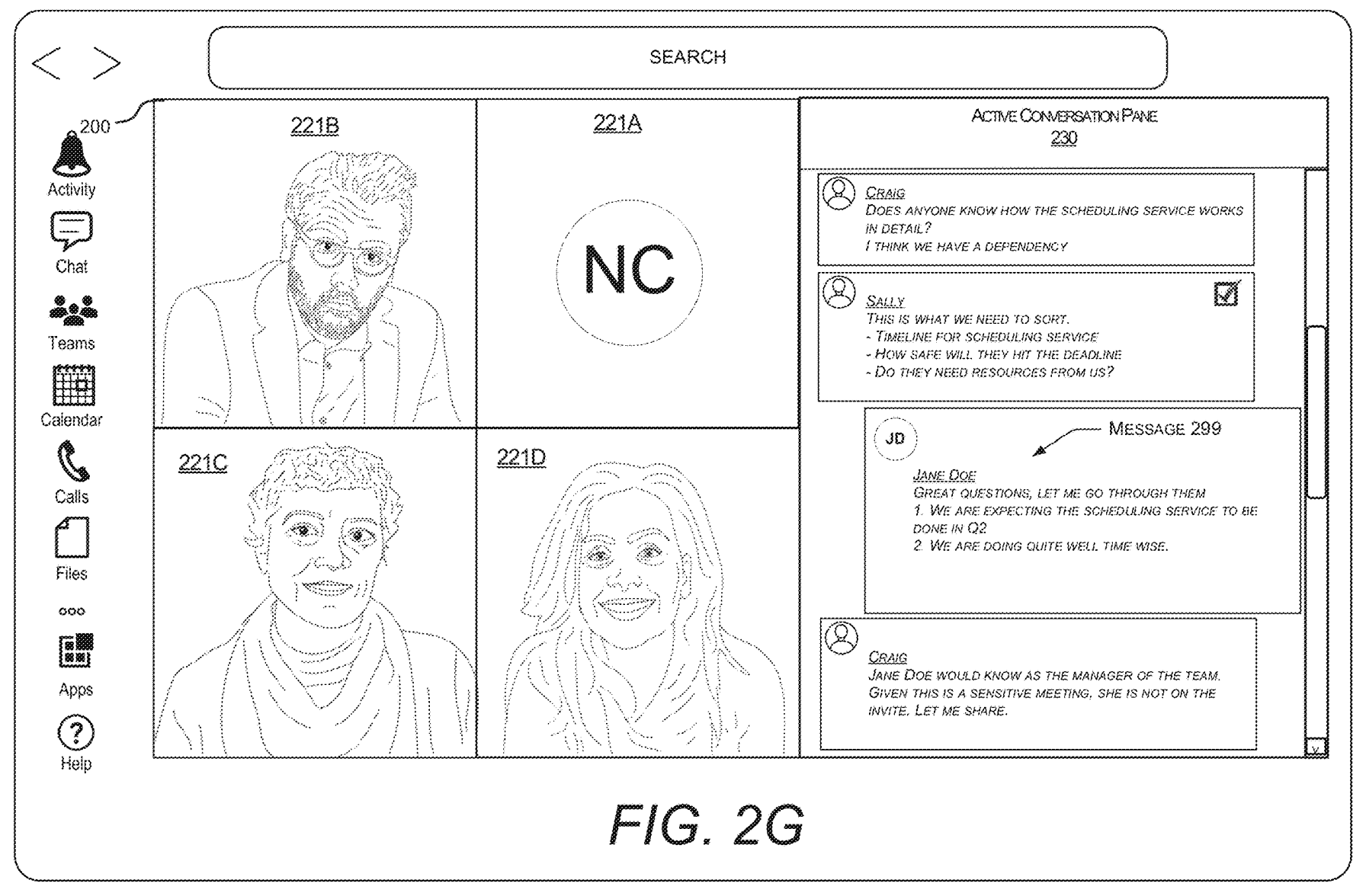

Referring to FIG. 2G, when Jane Doe makes a reply, the replies may be automatically rendered in a manner that is visible as a reply to the selected message. For example, message 299 may be rendered in the main meeting chat pane 230 with all the meeting participants so that the participants can see what Jane Doe has replied with.

Figure 3A:
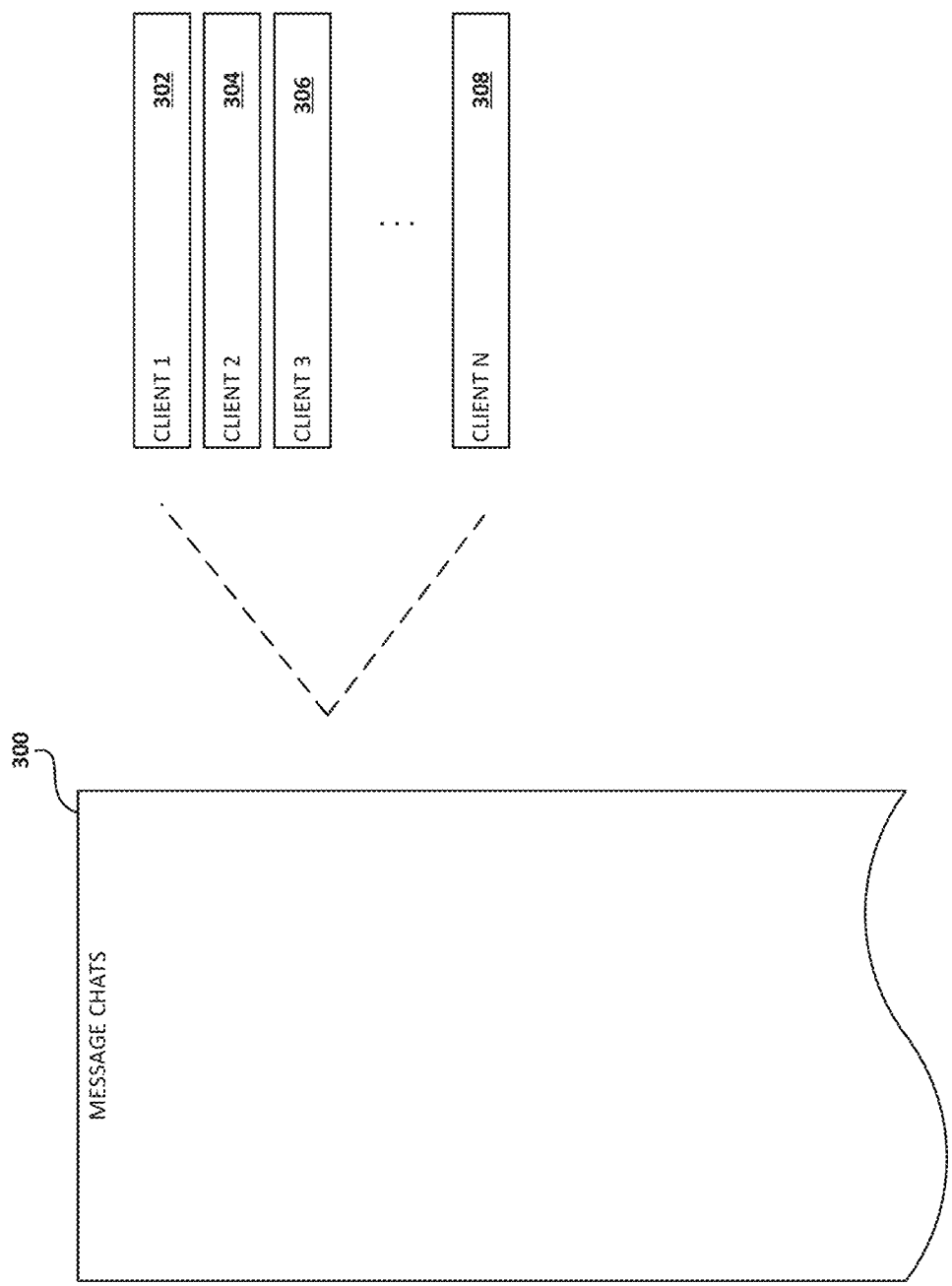
FIG. 3A illustrates an example system diagram in accordance with an embodiment.

FIGS. 3A to FIG. 3H illustrate various embodiments for implementing the techniques described herein. Turning to FIG. 3A, illustrated is an example application 300 rendering or otherwise processing messaging sessions for a number of clients 302, 304, 306, and 308, which in various scenarios can be users or participants in a chat.

Figure 3B:
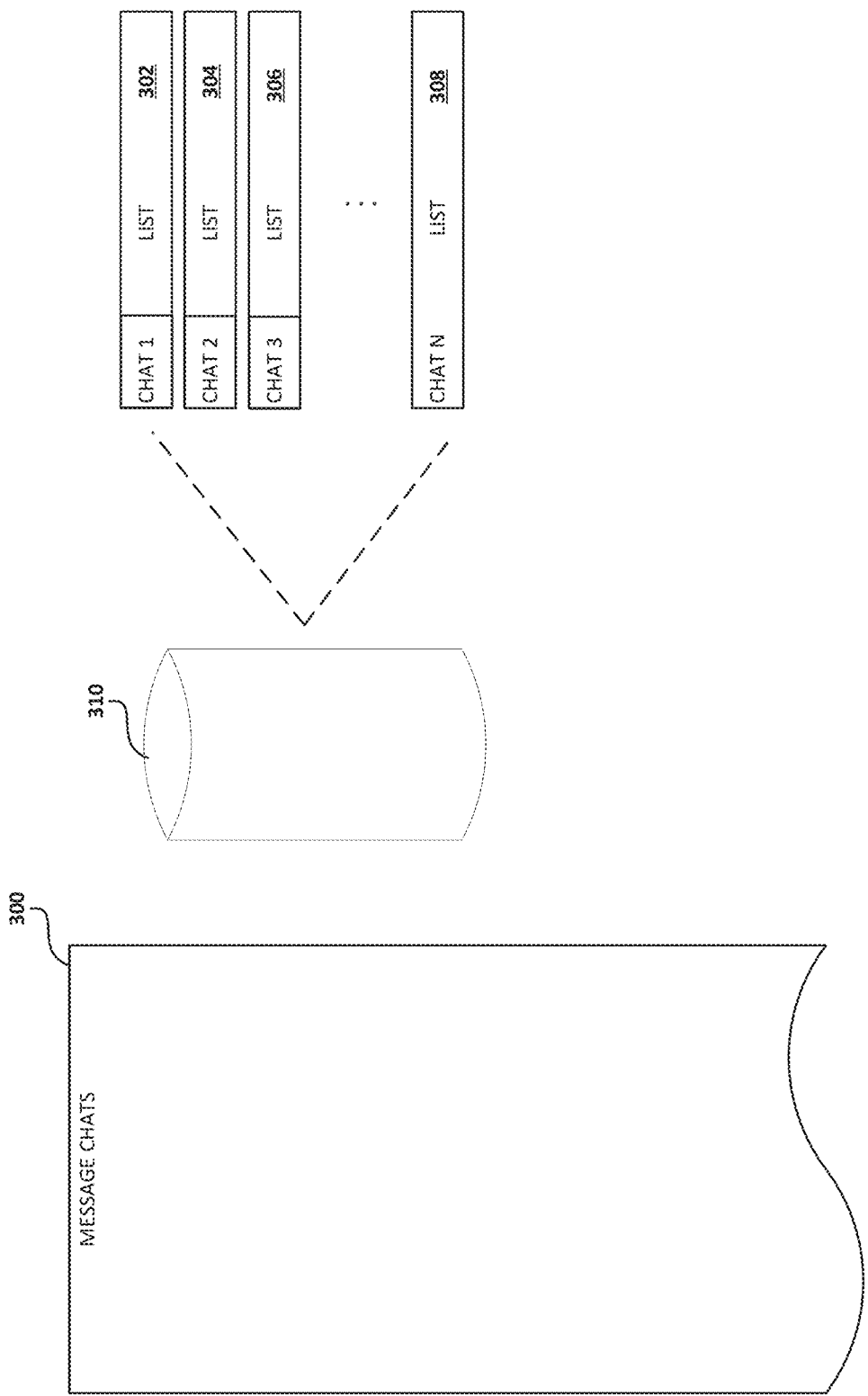
FIG. 3B illustrates an example system diagram in accordance with an embodiment.

Turning to FIG. 3B, illustrated is an example data storage 310 which may store thereon a database storing chat threads for the clients 302, 304, 306, and 308. For each chat thread, the record for each thread may include a list of users participating in each thread. As used herein, the record for each thread as well as other records described herein may be implemented as a data structure. It will be appreciated by one skilled in the art that the data structure shown in the figure may represent a data file, a database table, an object stored in a computer storage, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Figure 3C:
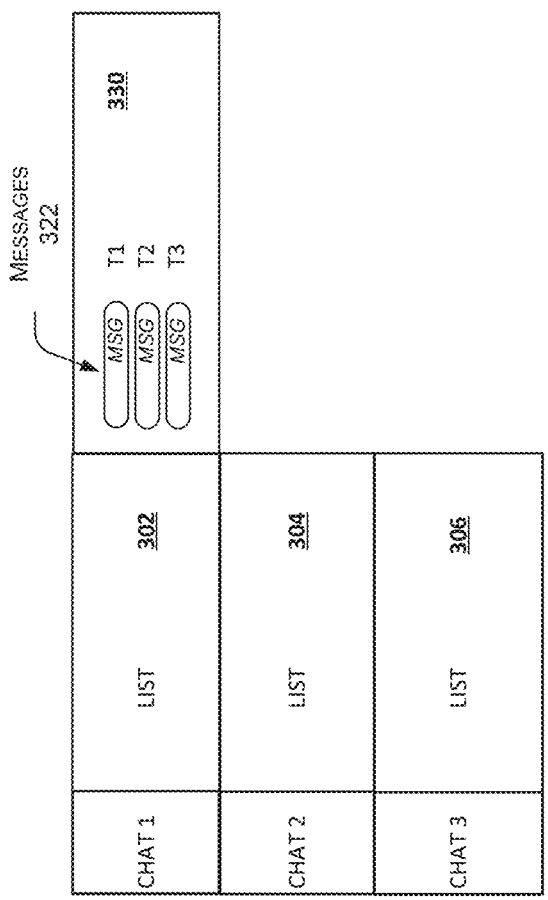
FIG. 3C illustrates an example system diagram in accordance with an embodiment.

Turning to FIG. 3C, illustrated is data structure 330 which may store thereon a record of messages 322 for each chat thread and associated times for the messages. In some embodiments, metadata can be included for each chat thread such as administrator, guest membership, and the like.

Figure 3D:
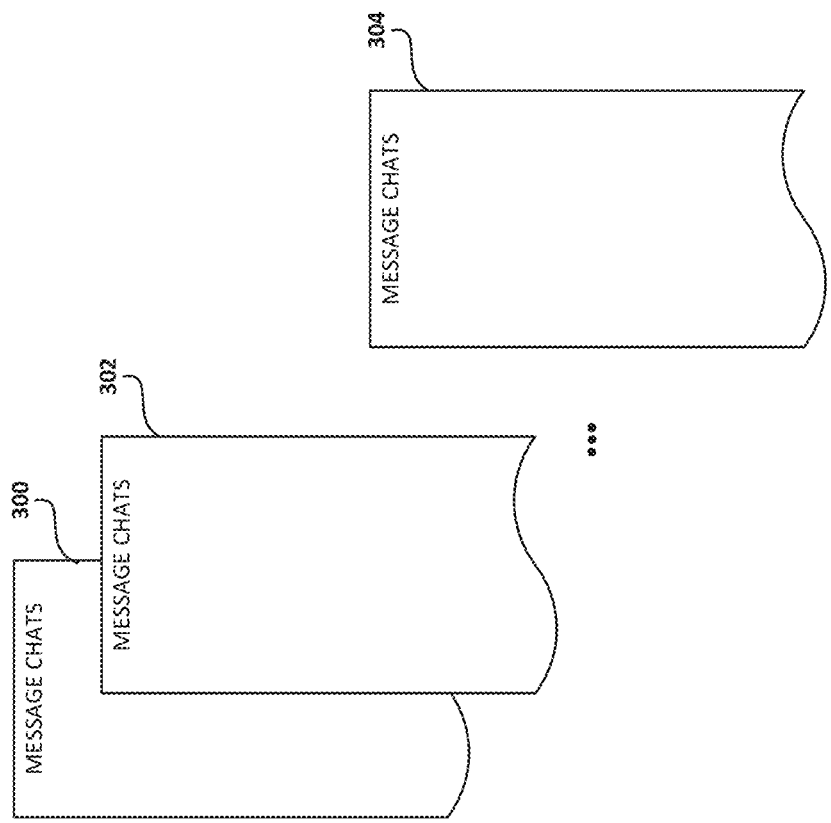
FIG. 3D illustrates an example system diagram in accordance with an embodiment.
Figure 3E:
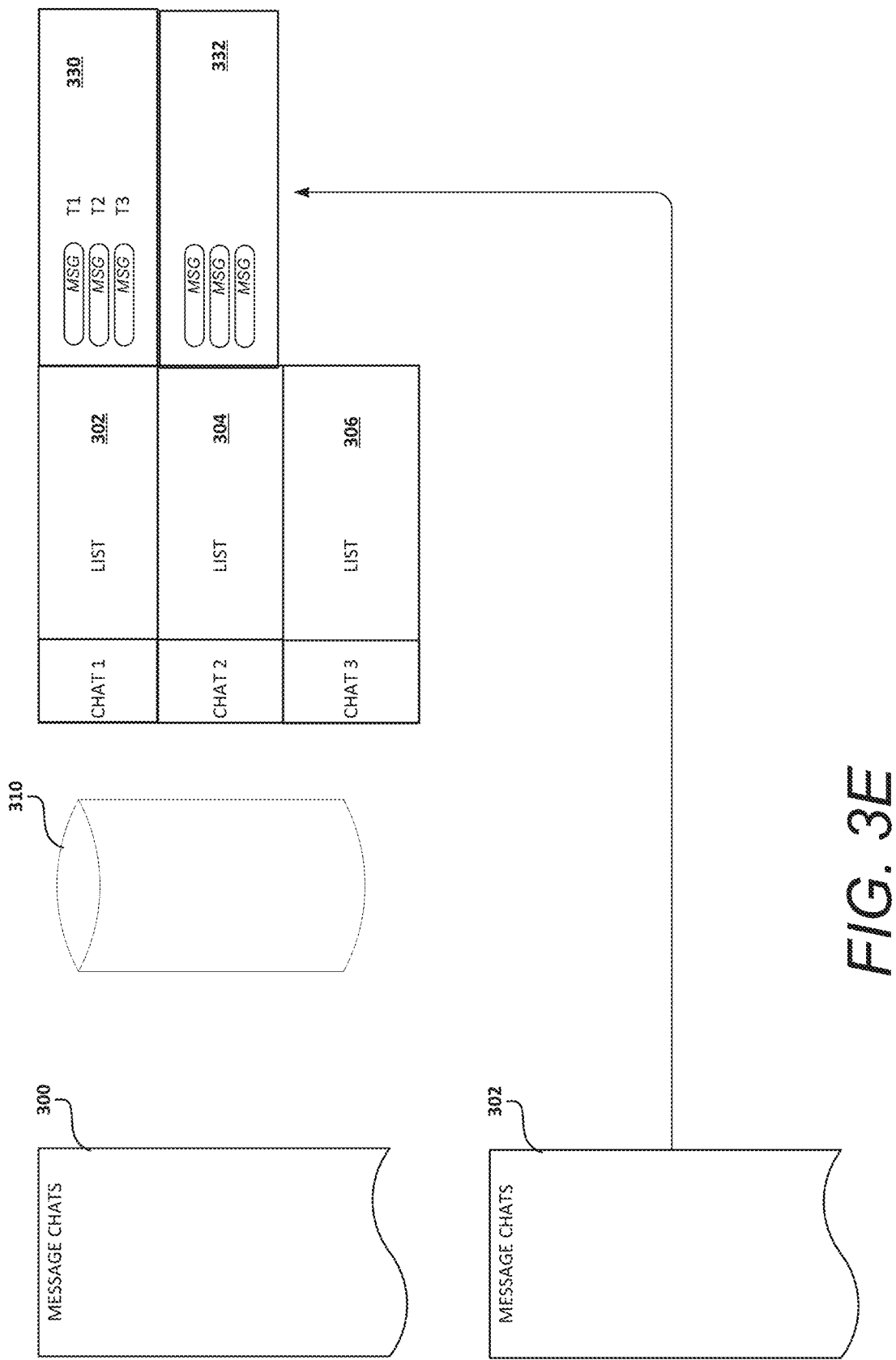
FIG. 3E illustrates an example system diagram in accordance with an embodiment.

Turning to FIG. 3D, illustrated is an example showing multiple chat threads 302 and 304 that may be generated, for instance when a side chat is started, such as if a new chat conversation is desired which leads to the start of a separate chat thread. Turning to FIG. 3E, illustrated is a data structure 332 which may be generated to store thereon a record of messages for a new chat session 302 that may have been started due to a new side chat. The new chat thread then stores in the database a record of messages for the chat thread, associated times for the messages, and metadata for the chat thread. This can lead to inefficient use of resources and can limit the visibility of the side chat as the side chat has started as a new thread.

Figure 3F:
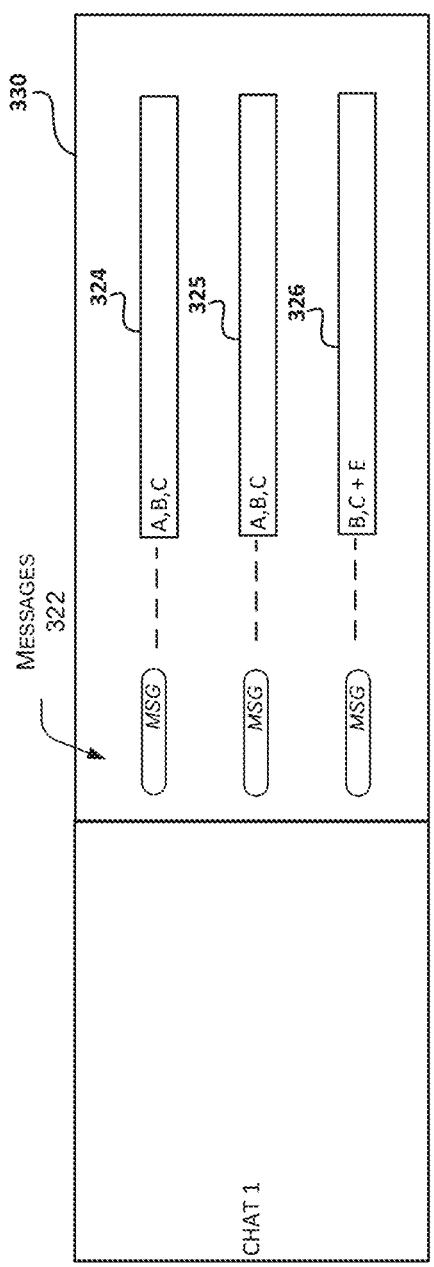
FIG. 3F illustrates an example system diagram in accordance with an embodiment.

Turning to FIG. 3F, illustrated is an example illustrating one implementation based on the embodiments disclosed herein. FIG. 3F illustrates that each of the messages 322 are associated with a record of the users who are associated with a particular message. FIG. 3F illustrates that for the first two of the messages 322, users A, B, and C are in record 324 and users A, B, and C are in record 325. In one example, if a side message is created in accordance with the present disclosure, record 326 may be generated and include users B, C, and external user E. Applicable metadata may be stored for each of the messages associated with records 324, 325, and 326. In this way, the records for the side messages are still part of the chat thread 1.

Figure 3G:
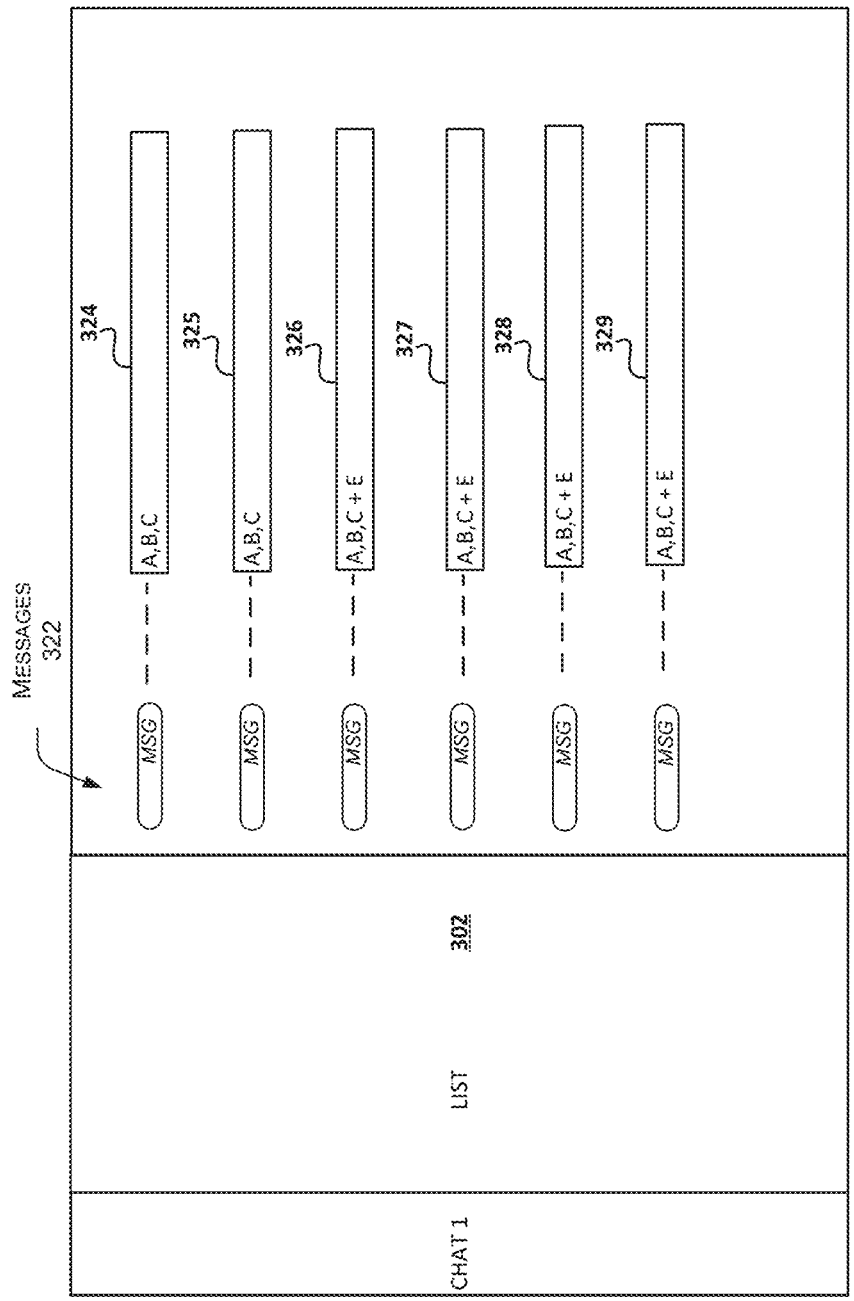
FIG. 3G illustrates an example system diagram in accordance with an embodiment.

Turning to FIG. 3G, illustrated is an example illustrating one embodiment in which a multi-dimensional data structure is implemented so that each of the messages 322 are associated with a record of the users who are associated with a particular message as well as metadata for each message and its associated users. FIG. 3G illustrates additional records 327, 328, and 329 that are generated as more messages are generated that are associated with users A, B, C, and external user E.

Figure 3H:
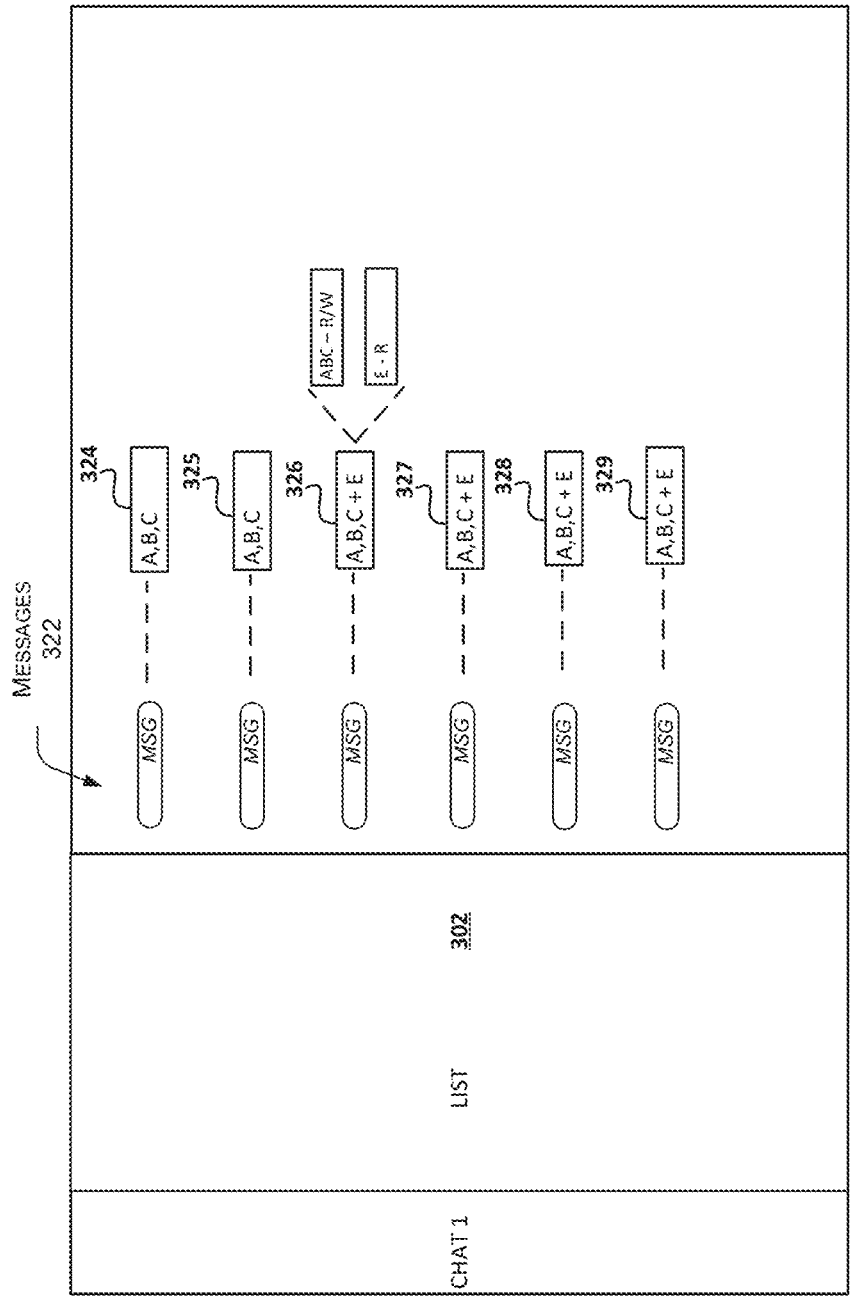
FIG. 3H illustrates an example system diagram in accordance with an embodiment.

Turning to FIG. 3H, illustrated is an example illustrating one embodiment in which the multi-dimensional data stricture is implemented so that each of the messages 322 are associated with a record of the users who are associated with a particular message, metadata for each message and associated users, and permissions for each message and associated users. As shown, record 326 includes users A, B, and C having read/write privileges, while user E only has read privileges. By implementing such a multi-dimensional data structure, granular control may be provided for each message. Each message may be associated with a set of users that may be independent of other messages that are in the same chat or a different chat. This may allow, for example, for a single message to be selected and shared with a set of users without the need to demarcate a new chat. Furthermore, the permissions for the set of users may be independent of other messages that are in the same chat or a different chat. This may allow, for example, for users associated with a single message to have permission settings that are particular to a single message. In some embodiments, the permission settings may be inherited from a predecessor message. In some embodiments, the permission settings may be determined based on roles of the users associated with the message. In some embodiments, the permissions may be determined based on inputs provided by a moderator or other participant. In some embodiments, the permission settings may be determined based on machine learning or other automated means of determining permission settings based on various inputs.

Figure 4:
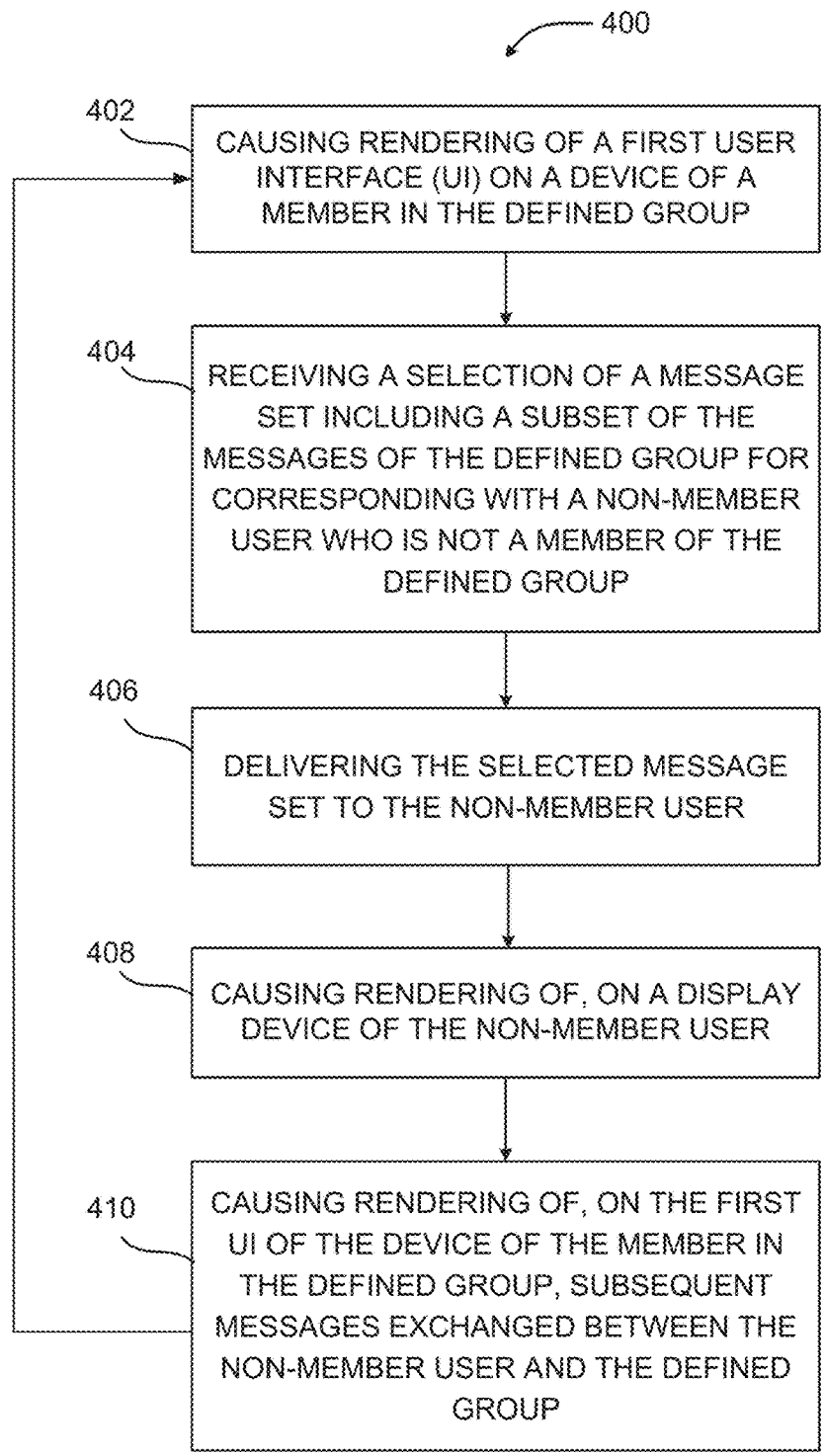
FIG. 4 illustrates a routine for allowing an external user to participate in an ongoing meeting's chat on a per-message basis with predetermined access permissions according to one embodiment.

FIG. 4 is a flow diagram illustrating aspects of a routine 400 to be performed by a data processing system for delivering messages among a defined group of users of a communication session. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 400 is described as running on a system 40, it can be appreciated that the routine 400 and other operations described herein can be executed on an individual computing device, e.g., computing device 44, or several devices.

Additionally, the operations illustrated in FIG. 4 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 400 begins at operation 402, which illustrates causing rendering of a first user interface (UI) on a device of a member in the defined group, including messages being communicated between the defined group of users of the communication session, the system permitting the defined group of users access to the messages of the communication session.

Operation 404 illustrates receiving a selection of a subset of the messages of the defined group for corresponding with a non-member user who is not a member of the defined group. The non-member user may correspond to an external user or an external participant.

Operation 406 illustrates delivering the selected message set to the non-member user.

Operation 408 illustrates causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set. For example, the subsequent messages exchanged between the non-member user and the subset of the users in the defined group directed to the selected message set is illustrated in FIG. 2F. The second UI includes messages that are exchanged in response to the selected message set and that are exchanged between the non-member user and the subset of the users in the defined group. "Direct to" thus refers to such messages that are part of the side chat that are associated with the selected message set.

Operation 410 illustrates causing rendering of, on the first UI of the device of the member in the defined group, subsequent messages exchanged between the non-member user and the defined group. In an embodiment, the subsequent messages may be rendered in context of messages prior to the selected message. For example, the subsequent messages may be rendered in sequence following the selected message.

Figure 5:
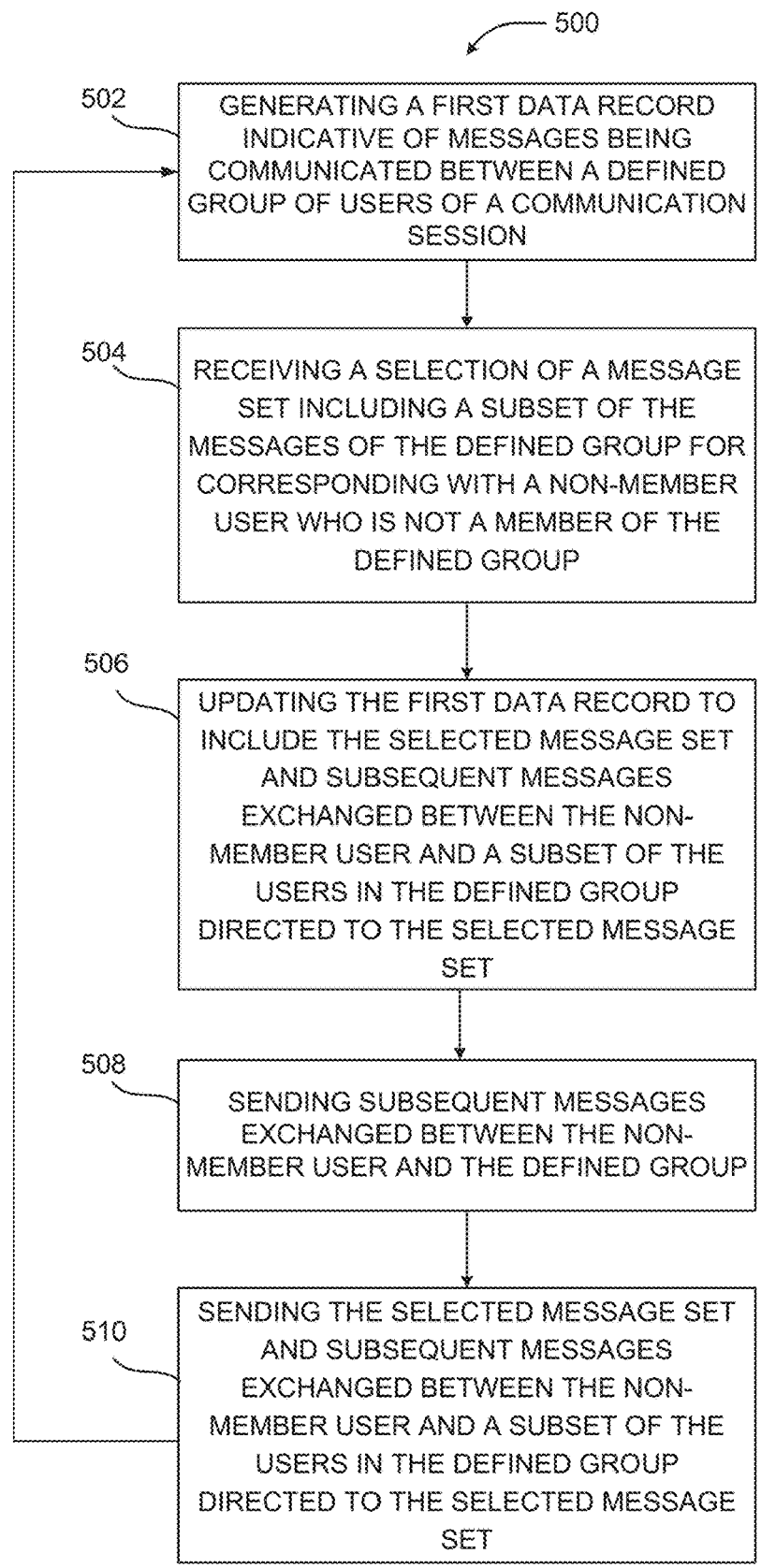
FIG. 5 illustrates a routine for allowing an external user to participate in an ongoing meeting's chat on a per-message basis with predetermined access permissions according to one embodiment.

FIG. 5 is a flow diagram illustrating aspects of a routine 500 for messaging among users of a communication session.

The routine 500 begins at operation 502, where the system generates a first data object indicative of the defined group of users of the communication session, messages being communicated between the defined group of users, and permissions defined for the defined group of users to access content of the communication session.

At operation 504, the system can receive a selection of a message set including a subset of the messages of the defined group for corresponding with a non-member user who is not a member of the defined group.

At operation 506, in response to receiving the selection the system updates the first data object to include the selected message set and subsequent messages exchanged between the non-member user and a subset of the users in the defined group directed to the selected message set, and permissions defined for the additional participant to limit full access to other subsequent messages in the defined group not directed to the selected message set.

At operation 508, the system can send, to a display device of the non-member user, the selected message set and subsequent messages exchanged between the non-member user and a subset of the users in the defined group directed to the selected message set, wherein access to other subsequent messages in the defined group not directed to the selected message set is controlled by the permissions for the non-member user.

At operation 510, the system can send, to the first UI of the device of the member in the defined group, subsequent messages exchanged between the non-member user and the defined group, wherein access to the messages being communicated between the defined group of users is controlled by the permissions for the defined group. In an embodiment, the subsequent messages may be rendered in context of messages prior to the selected message. For example, the subsequent messages may be rendered in sequence following the selected message.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 6:
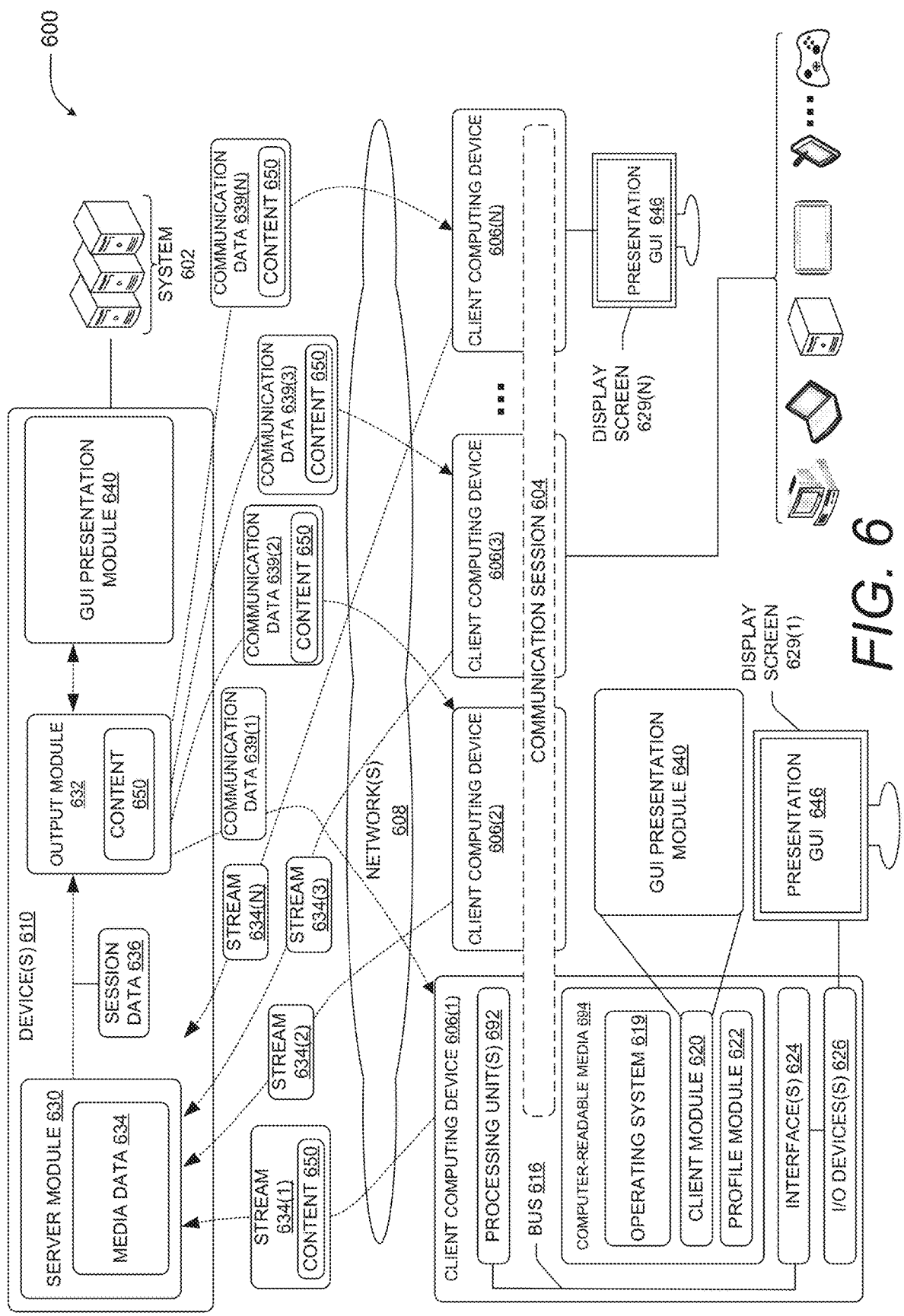
FIG. 6 is a computing system diagram showing aspects of an illustrative operating environment for the technologies disclosed herein.

FIG. 6 is a diagram illustrating an example environment 600 in which a system 602 can implement the techniques disclosed herein. In some implementations, a system 602 may function to collect, analyze, and share content that is displayed to users of a communication session 604. As illustrated, the communication session 604 may be implemented between a number of client computing devices 606(1) through 606(N) (where N is a number having a value of two or greater) that are associated with the system 602 or are part of the system 602. The client computing devices 606(1) through 606(N) enable users, also referred to as individuals, to participate in the communication session 604. The client computing devices 606 can correlate to the user computing devices 106 shown in FIG. 1. Although some examples show one of the computers 606 processing aspects of the present techniques, it can be appreciated that the techniques disclosed herein can be applied to other computing devices and are not to be construed as limiting.

In this example, the communication session 604 is hosted, over one or more network(s) 608, by the system 602. That is, the system 602 can provide a service that enables users of the client computing devices 606(1) through 606(N) to participate in the communication session 604 (e.g., via a live viewing and/or a recorded viewing). Consequently, a "participant" to the communication session 604 can comprise a user and/or a client computing device (e.g., multiple users may be in a room participating in a communication session via the use of a single client computing device), each of which can communicate with other participants. As an alternative, the communication session 604 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 604. A computerized agent to collect participant data in the communication session 604 may be able to link to such external communication sessions. Therefore, the computerized agent may receive information, such as date, time, session particulars, and the like, that enables connectivity to such external communication sessions. In one example, a chat conversation can be conducted in accordance with the communication session 604. Additionally, the system 602 may host the communication session 604, which includes at least a plurality of participants co-located at a meeting location, such as a meeting room or auditorium, or located in disparate locations.

In the examples described herein, client computing devices 606(1) through 606(N) participating in the communication session 604 are configured to receive and render for display, on a user interface of a display screen, communication data. The communication data can comprise a collection of various instances, or streams, of live content and/or recorded content. The collection of various instances, or streams, alive content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 604 live as activity occurs, or alternatively, via a recording at a later time after the activity occurs. In examples described herein, client computing devices 606(1) through 606(N) participating in the communication session 604 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 604. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.6 standards (e.g., 802.6g, 802.6n, 802.6ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, devices) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) (which are also referred to herein as computing devices 104A-104N) may also include one or more interface(s) 624 to enable communications between client computing device (s) 606(1) through 606(N) and other networked devices, such as device(s) 610, over network(s) 608. Such network interface(s) 624 may include one or more network interface controllers (NICs) or other types of transceiver devices (not shown in FIG. 6) to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(1)), which can display a UI according to the techniques described herein.

In the example environment 600 of FIG. 6, client computing devices 606(1) through 606(N) may use their respective client modules 620 to connect with one another and/or other external device(s) in order to participate in the communication session 604, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network (s) 608.

The client computing device(s) 606(1) through 606(N) (each of which are also referred to herein as a "data processing system") may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 604 (the collection being referred to herein as "media data 634"). In some scenarios, not all of the client computing devices that participate in the communication session 604 provide a media stream. For example, a client computing device may only be a consuming, or a "listening", device such that it only receives content associated with the communication session 604 but does not provide any content to the communication session 604.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the GUI presentation module 640, at the device(s) 610 and/or the client computing device 606, may analyze communication data 639 to determine an appropriate manner for displaying video, image, and/or content on the display screen 629(1) of an associated client computing device 606. In some implementations, the GUI presentation module 640 may provide video, image, and/or content to a presentation GUI 646 rendered on the display screen 629(1) of the associated client computing device 606. The presentation GUI 646 may be caused to be rendered on the display screen 629(1) by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, and a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had while viewing the presenter. In some implementations, the presentation GUI 646 may include a video feed of a plurality of participants associated with a meeting, such as a general communication session. In other implementations, the presentation GUI 646 may be associated with a channel, such as a chat channel, enterprise teams channel, or the like. Therefore, the presentation GUI 646 may be associated with an external communication session that is different than the general communication session.

Figure 7:
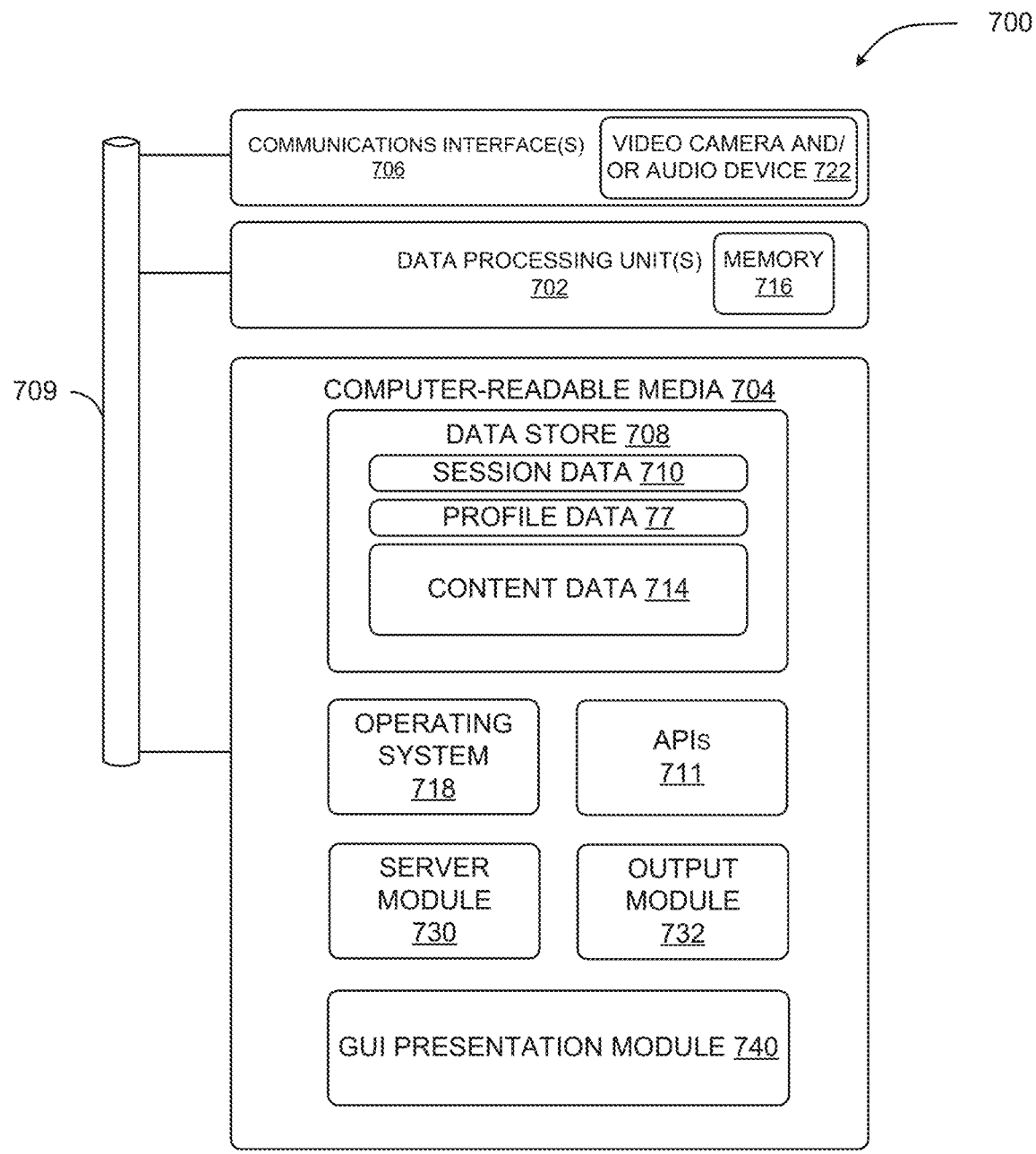
FIG. 7 is a computing architecture diagram showing aspects of the configuration and operation of a computing device that can implement aspects of the technologies disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 179. The device 700 may represent one of the device(s) described herein. Additionally, or alternatively, the device 700 may represent one of the client computing devices 1106.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") (not shown in FIG. 7) or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 1136), profile data 77 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 179.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 711 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The disclosure presented herein also encompasses the subject matter set forth in the following clauses:

Clause 1: A machine-implemented method for controlling a data processing system for delivering messages among a defined group of users of a communication session, the method comprising:

causing rendering of a first user interface (UI) on a device of a member in the defined group, including messages being communicated between the defined group of users of the communication session, the system permitting the defined group of users to access the messages of the communication session;

receiving a selection of a message set including a subset of the messages of the defined group for corresponding with a non-member user who is not a member of the defined group;

delivering the selected message set to the non-member user;

causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set; and causing rendering of, on the first UI of the device of the member in the defined group, subsequent messages exchanged between the non-member user and the defined group.

Clause 2: The method of clause 1, wherein the subsequent messages are rendered on the first UI as a visually separate messaging session within a full message view of previous messages that were rendered on the first.

Clause 3: The method of any of clauses 1-2, wherein the visually separate messaging session is a separate panel rendered in the first UI.

Clause 4: The method of any of clauses 1-3, wherein the visually separate messaging session is rendered alongside the previous messages in a side-by-side format.

Clause 5: The method of any of clauses 1-4, wherein the non-member user is assigned a first access permission level and the users are assigned a second access permission level.

Clause 6: The method of any of clauses 1-5, wherein the first access permission level prevents indication of a full listing of the users of the communication session and content of the communication session.

Clause 7: The method of clauses 1-6, wherein the selected messages and subsequent messages that include the non-member user are displayed on the first UI with a symbol indicating an association with the selected message.

Clause 8: The method of any of clauses 1-7, further comprising enabling invitation of further participants to the communication session in response to selection of additional ones of the messages.

Clause 9: The method of any of clauses 1-8, further comprising enabling invitation of further participants to the communication session in response to selection of a file that was shared during the communication session.

Clause 10: The method of any of clauses 1-9, wherein the second UI includes the selected messages.

Clause 11: A system, comprising:

one or more data processing units; and a computer-readable medium having encoded thereon computer-executable instructions to cause the one or more data processing units to perform operations comprising:

causing rendering of a first user interface (UI) on a device of a member in a defined group of users of a communication session, including messages being communicated between the defined group of users of the communication session, the system permitting the defined group of users to access the messages of the communication session;

receiving a selection of a message set including a subset of the messages of the defined group for corresponding with a non-member user who is not a member of the defined group;

delivering the selected message set to the non-member user;

causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set; and causing rendering of, on the first UI of the device of the member in the defined group, subsequent messages exchanged between the non-member user and the defined group.

Clause 12: The system of clause 11, wherein the subsequent messages are rendered on the first UI as a visually separate messaging session within a full message view of previous messages that were rendered on the first UI.

Clause 13: The system of any of clauses 11 and 12, wherein the visually separate messaging session is a separate panel rendered in the first UI.

Clause 14: The system of any clauses 11-13, wherein the visually separate messaging session is rendered alongside the previous messages in a side-by-side format.

Clause 15: The system of any clauses 11-14, wherein the non-member user is assigned a first access permission level and the users are assigned a second access permission level.

Clause 16: A system, comprising:

means for causing rendering of a first user interface (UI) on a device of a member in a defined group of users of a communication session, including messages being communicated between the defined group of users of the communication session, the system permitting access to the messages of the communication session by the defined group of users;

means for receiving a selection of a a subset of the messages of the defined group for corresponding with a non-member user who is not a member of the defined group;

means for delivering the selected message set to the non-member user;

means for causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set; and means for causing rendering of, on the first UI of the device of the member in the defined group, subsequent messages exchanged between the non-member user and the defined group.

Clause 17: The system of clause 16, further comprising means for enabling invitation of further participants to the communication session in response to selection of additional ones of the messages.

Clause 18: The system of any of clauses 16 and 17, further comprising means for enabling invitation of further participants to the communication session in response to selection of a file that was shared during the communication session.

Clause 19: The system of any of the clauses 16-18, wherein the second UI includes the selected messages.

Clause 20: The system of any of the clauses 16-19, wherein the non-member user is assigned a first access permission level and the users are assigned a second access permission level, wherein the first access permission level prevents indication of a full listing of the users of the communication session and content of the communication session.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A machine-implemented method for controlling a data processing system for delivering messages among a defined group of users of a communication session, the method comprising:

causing rendering of a first user interface (UI) on a device of a member in the defined group, including messages being communicated between the defined group of users of the communication session, the system permitting the defined group of users to access the messages of the communication session;

receiving a selection of a message set including a subset of the messages of the defined group for corresponding with a non-member user who is not a member of the defined group;

delivering the selected message set to the non-member user;

causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set; and causing rendering of, on the first UI of the device of the member in the defined group, subsequent messages exchanged between the non-member user and the defined group, wherein the subsequent messages are rendered on the first UI as a visually separate messaging session within a full message view of previous messages that were rendered on the first UI.

2. The method of claim 1, wherein the visually separate messaging session is a separate panel rendered in the first UI.

3. The method of claim 1, wherein the visually separate messaging session is rendered alongside the previous messages in a side-by-side format.

4. The method of claim 1, wherein the non-member user is assigned a first access permission level and the users are assigned a second access permission level.

5. The method of claim 4, wherein the first access permission level prevents indication of a full listing of the users of the communication session and content of the communication session.

6. The method of claim 1, wherein the selected messages and subsequent messages that include the non-member user are displayed on the first UI with a symbol indicating an association with the selected message.

7. The method of claim 1, further comprising enabling invitation of further participants to the communication session in response to selection of additional ones of the messages.

8. The method of claim 1, further comprising enabling invitation of further participants to the communication session in response to selection of a file that was shared during the communication session.

9. The method of claim 1, wherein the second UI includes the selected messages.

10. A system, comprising:
one or more data processing units; and
a computer-readable medium having encoded thereon computer-executable instructions to cause the one or more data processing units to perform operations comprising:
causing rendering of a first user interface (UI) on a device of a member in a defined group of users of a communication session, including messages being communicated between the defined group of users of the communication session, the system permitting the defined group of users to access the messages of the communication session;
receiving a selection of a message set including a subset of the messages of the defined group for corresponding with a non-member user who is not a member of the defined group;
delivering the selected message set to the non-member user;
causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set; and
causing rendering of, on the first UI of the device of the member in the defined group, subsequent messages exchanged between the non-member user and the defined group, wherein the subsequent messages are rendered on the first UI as a visually separate messaging session within a full message view of previous messages that were rendered on the first UI.

11. The system of claim 10, wherein the visually separate messaging session is a separate panel rendered in the first UI.

12. The system of claim 10, wherein the visually separate messaging session is rendered alongside the previous messages in a side-by-side format.

13. The system of claim 12, wherein the non-member user is assigned a first access permission level and the users are assigned a second access permission level.

14. A non-transitory computer-readable medium having encoded thereon computer-executable instructions that, when executed by a processor of a computing device, cause the computing device to perform operations, comprising:
causing rendering of a first user interface (UI) on a device of a member in a defined group of users of a communication session, including messages being communicated between the defined group of users of the communication session, the computing device permitting access to the messages of the communication session by the defined group of users;
receiving a selection of a message set comprising a subset of the messages of the defined group for corresponding with a non-member user who is not a member of the defined group;
delivering the selected message set to the non-member user;
causing rendering of, on a display device of the non-member user, a second UI including the selected message set and subsequent messages exchanged between the non-member user and a subset of the users in the defined group directed to the selected message set, but not full access to other subsequent messages in the defined group not directed to the selected message set; and
causing rendering of, on the first UI of the device of the member in the defined group, subsequent messages exchanged between the non-member user and the defined group, wherein the subsequent messages are rendered on the first UI as a visually separate messaging session within a full message view of previous messages that were rendered on the first UI.

15. The non-transitory computer-readable medium of claim 14, further comprising computer-executable instructions that, when executed by the processor of the computing device, cause the computing device to perform operations comprising enabling invitation of further participants to the communication session in response to selection of additional ones of the messages.

16. The non-transitory computer-readable medium of claim 14, further comprising computer-executable instructions that, when executed by the processor of the computing device, cause the computing device to perform operations comprising enabling invitation of further participants to the communication session in response to selection of a file that was shared during the communication session.

17. The non-transitory computer-readable medium of claim 14, wherein the second UI includes the selected messages.

18. The non-transitory computer-readable medium of claim 14, wherein the non-member user is assigned a first access permission level and the users are assigned a second access permission level, wherein the first access permission level prevents indication of a full listing of the users of the communication session and content of the communication session.

* * * * *